(12) United States Patent
Lee et al.

(10) Patent No.: US 10,880,915 B2
(45) Date of Patent: Dec. 29, 2020

(54) METHOD FOR TERMINAL FOR TRANSMITTING UPLINK CONTROL INFORMATION IN WIRELESS COMMUNICATION SYSTEM, AND TERMINAL UTILIZING METHOD

(71) Applicant: LG ELECTRONICS INC., Seoul (KR)

(72) Inventors: Seungmin Lee, Seoul (KR); Suckchel Yang, Seoul (KR); Seonwook Kim, Seoul (KR); Joonkui Ahn, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 16/324,429

(22) PCT Filed: Aug. 11, 2017

(86) PCT No.: PCT/KR2017/008785
§ 371 (c)(1),
(2) Date: Feb. 8, 2019

(87) PCT Pub. No.: WO2018/030858
PCT Pub. Date: Feb. 15, 2018

(65) Prior Publication Data
US 2019/0223201 A1    Jul. 18, 2019

Related U.S. Application Data

(60) Provisional application No. 62/446,830, filed on Jan. 16, 2017, provisional application No. 62/446,419, (Continued)

(51) Int. Cl.
*H04W 72/04* (2009.01)
*H04L 5/00* (2006.01)
(Continued)

(52) U.S. Cl.
CPC ........... *H04W 72/1268* (2013.01); *H04L 5/00* (2013.01); *H04L 5/0048* (2013.01);
(Continued)

(58) Field of Classification Search
CPC ........... H04W 72/0413; H04W 52/146; H04W 52/58; H04W 52/60; H04W 72/04; H04W 72/042; H04W 72/044
See application file for complete search history.

(56) References Cited

U.S. PATENT DOCUMENTS

2010/0158078 A1* 6/2010 Ro ................. H04B 1/7143
375/135
2013/0322391 A1* 12/2013 Yang ................ H04L 5/001
370/329
(Continued)

FOREIGN PATENT DOCUMENTS

KR   10-2014-0140589 A    12/2014
WO    2012/111975 A2      8/2012
(Continued)

*Primary Examiner* — Sai Aung
(74) *Attorney, Agent, or Firm* — Dentons US LLP

(57) ABSTRACT

Provided are a method for a terminal for transmitting uplink control information (UCI) in a wireless communication system, and a terminal utilizing the method. The method generates modulation symbols of the UCI, maps the modulation symbols in a physical uplink shared channel (PUSCH) region, and transmits the modulation symbols mapped in the PUSCH region, wherein the modulation symbols are mapped in the PUSCH region so as to be symmetric in a frequency region with respect to a particular frequency.

6 Claims, 38 Drawing Sheets

Related U.S. Application Data filed on Jan. 14, 2017, provisional application No. 62/421,277, filed on Nov. 12, 2016, provisional application No. 62/420,687, filed on Nov. 11, 2016, provisional application No. 62/417,976, filed on Nov. 4, 2016, provisional application No. 62/417,360, filed on Nov. 4, 2016, provisional application No. 62/373,439, filed on Aug. 11, 2016.

(51) Int. Cl.
*H04W 72/12* (2009.01)
*H04W 72/14* (2009.01)

(52) U.S. Cl.
CPC .......... *H04L 5/0053* (2013.01); *H04L 5/0055* (2013.01); *H04L 5/0057* (2013.01); *H04W 72/0413* (2013.01); *H04W 72/14* (2013.01); *H04L 5/005* (2013.01); *H04L 5/0051* (2013.01)

(56) References Cited

U.S. PATENT DOCUMENTS

| | | | |
|---|---|---|---|
| 2014/0056273 A1* | 2/2014 | Jang | H04L 1/0028 370/329 |
| 2014/0161067 A1* | 6/2014 | Lee | H04W 72/0413 370/329 |
| 2015/0382337 A1 | 12/2015 | Ko et al. | |
| 2018/0063820 A1* | 3/2018 | Xiong | H04L 5/1469 |
| 2018/0110041 A1* | 4/2018 | Bendlin | H04L 5/0007 |

FOREIGN PATENT DOCUMENTS

| | | |
|---|---|---|
| WO | 2013/022260 A2 | 2/2013 |
| WO | 2015/115804 A1 | 8/2015 |

* cited by examiner

METHOD FOR TERMINAL FOR TRANSMITTING UPLINK CONTROL INFORMATION IN WIRELESS COMMUNICATION SYSTEM, AND TERMINAL UTILIZING METHOD

CROSS-REFERENCE TO RELATED APPLICATIONS

This application is the National Stage filing under 35 U.S.C. 371 of International Application No. PCT/KR2017/008785, filed on Aug. 11, 2017, which claims the benefit of U.S. Provisional Applications No. 62/373,439 filed on Aug. 11, 2016, No. 62/417,360 filed on Nov. 4, 2016, No. 62/417,976 filed on Nov. 4, 2016, No. 62/420,687 filed on Nov. 11, 2016, No. 62/421,277 filed on Nov. 12, 2016, No. 62/446,419 filed on Jan. 14, 2017, and No. 62/446,830 filed on Jan. 16, 2017, the contents of which are all hereby incorporated by reference herein in their entirety.

BACKGROUND OF THE INVENTION

Field of the Invention

The present disclosure relates to wireless communications, and more particularly, to an uplink control information transmission method performed by an user equipment in a wireless communication system, and the user equipment for performing the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication.

Communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) for convenience.

Meanwhile, in NR, uplink control information may be transmitted using a physical uplink control channel (PUCCH) or may be transmitted using a physical uplink shared channel (PUSCH). When the uplink control information is transmitted using the PUSCH together with uplink data, this is expressed that the uplink control information is piggybacked and transmitted on the PUSCH.

In NR, a reference signal different from that a legacy reference signal may be used in the PUSCH region. An arrangement of the reference signal may also be different from that in the legacy PUSCH region. Taking this into consideration, it is necessary to define how to map the uplink control information to the PUSCH region when piggybacking and transmitting the uplink control information on the PUSCH.

SUMMARY OF THE INVENTION

The present disclosure aims to provide an uplink control information transmission method performed by a user equipment in a wireless communication system and provide the user equipment for performing the same.

In one aspect, provided is a method for transmitting, by a user equipment (UE), uplink control information (UCI) in a wireless communication system. The method comprises generating modulation symbols of the UCI, mapping the modulation symbols to a physical uplink shared channel (PUSCH) region, and transmitting the modulation symbols mapped to the PUSCH region. Herein, the modulation symbols may be mapped to the PUSCH region in a symmetric manner around a specific frequency in a frequency region.

The specific frequency may be a subcarrier to which a phase interference compensation reference signal (PCRS) is mapped.

The PCRS may be mapped to the specific frequency in successive time durations constituting the PUSCH region.

The UCI may be preferentially mapped to a resource element (RE) neighboring to the PCRS.

The UCI may include an ACK/NACK (acknowledgment/negative-acknowledgment).

The UCI may include at least one of ACK/NACK (acknowledgment/negative-acknowledgment), rank indication (RI), precoding matrix indicator (PMI) and channel quality indicator (CQI).

After data mapping to the PUSCH region is punctured, the ACK/NACK may be mapped to the PUSCH region.

A first symbol of a subframe including the PUSCH region may be mapped to a demodulation reference signal (DM RS).

The UCI may map to a second symbol neighboring to the first symbol corresponding to a location of the DM RS in the time region.

In another aspect, provided is a user equipment (UE). The UE comprises a radio frequency (RF) unit for transmitting and receiving a radio signal and a processor operating in conjunction with the RF unit. The processor is configured for generating modulation symbols of the UCI, mapping the modulation symbols to a physical uplink shared channel (PUSCH) region, transmitting the modulation symbols mapped to the PUSCH region. Herein, the modulation symbols may be mapped to the PUSCH region in a symmetric manner around a specific frequency in a frequency region.

According to the present invention, in NR, when piggybacking and transmitting the uplink control information on the PUSCH region, the inter-cell interference, interference with other user equipments, etc. may be reduced, and the decoding performance of the uplink control information may be improved.

DESCRIPTION OF EXEMPLARY EMBODIMENTS

Figure 1:
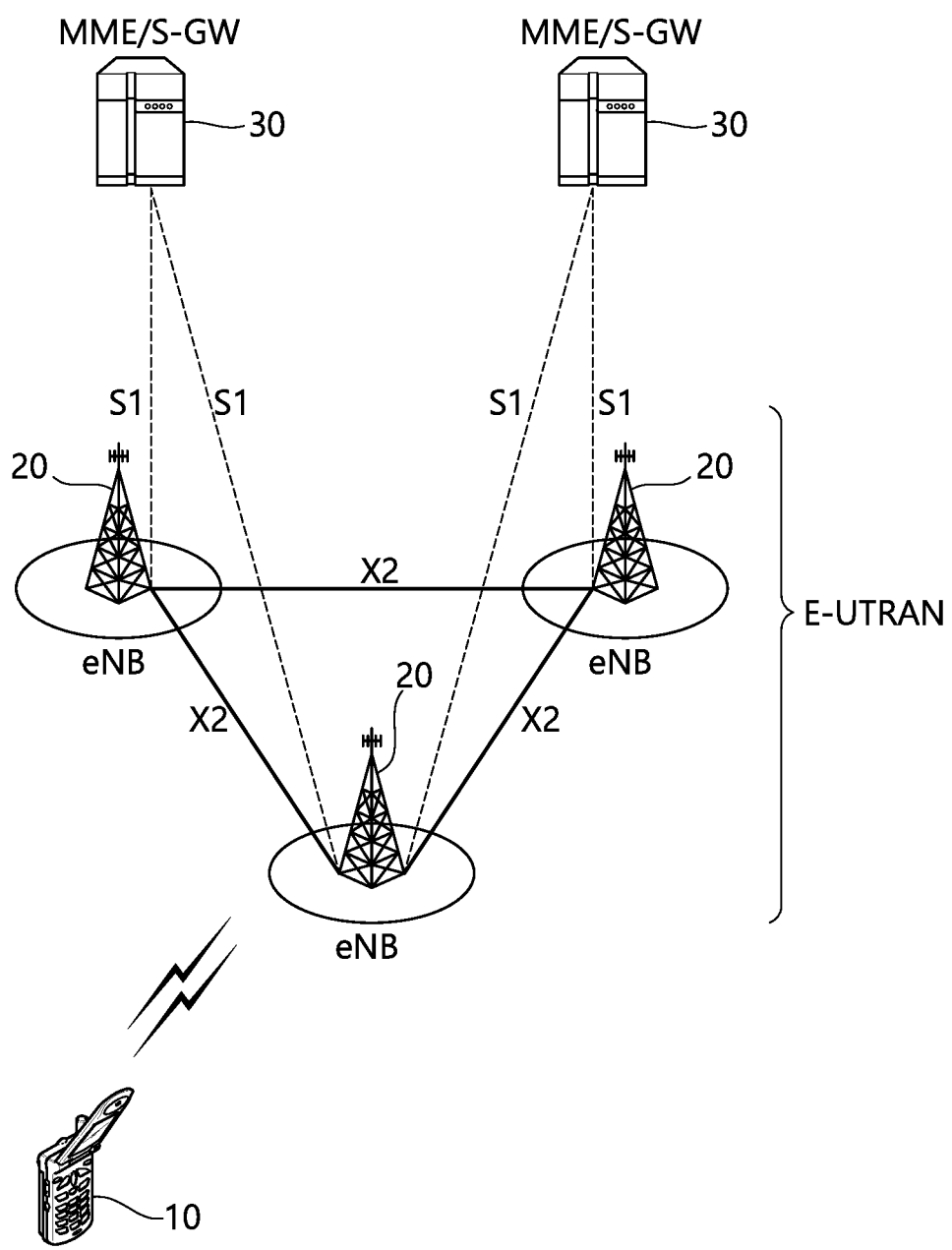
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
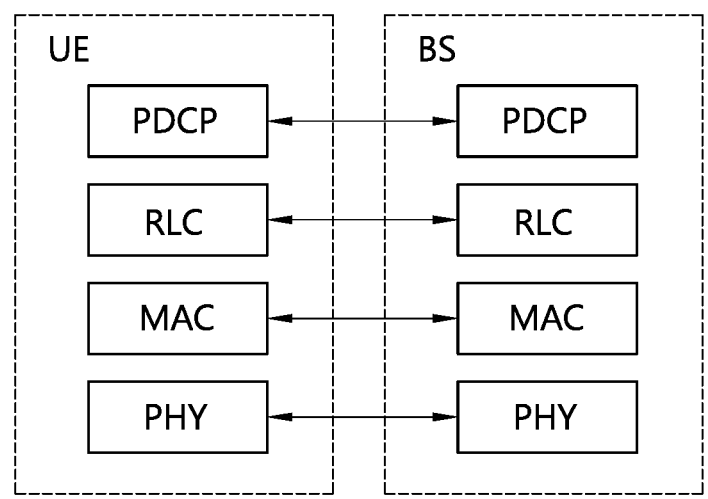
FIG. 2 is a diagram showing a wireless protocol architecture for a user plane.
Figure 3:
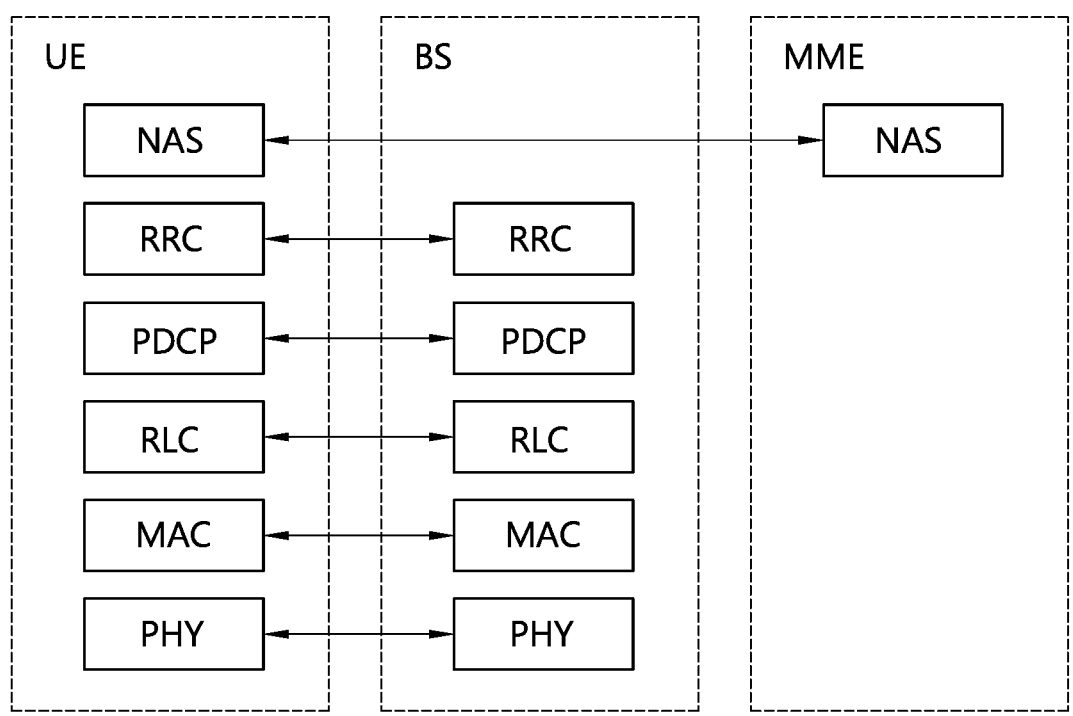
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) or new radio (NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) for convenience.

Figure 4:
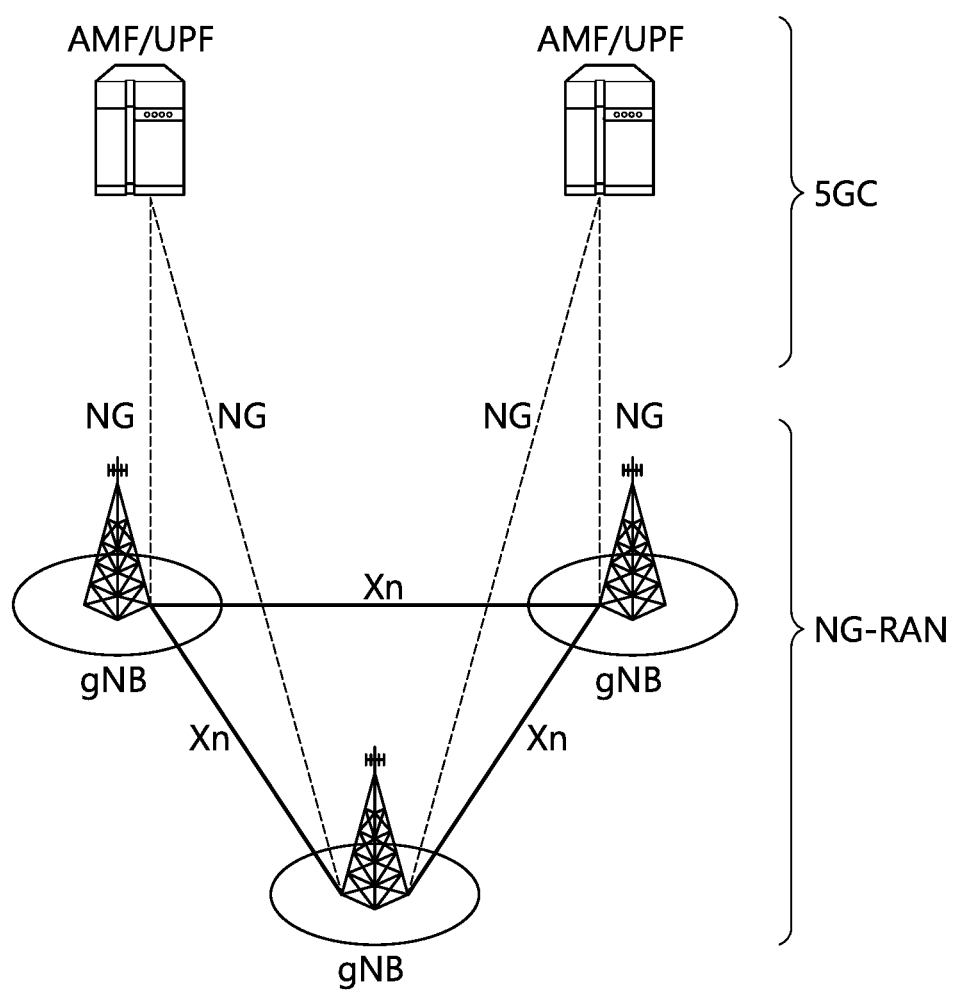
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
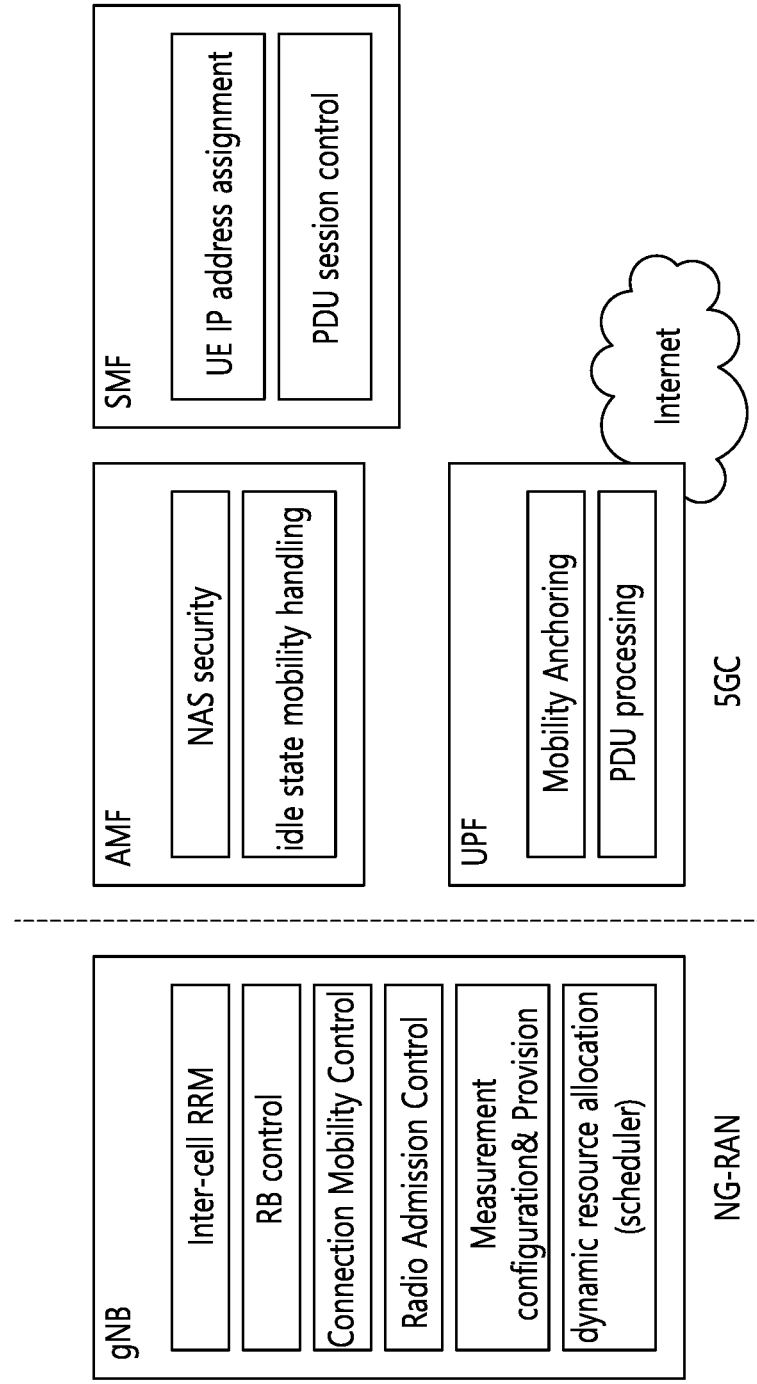
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and the like.

In NR, the following technologies/features can be applied.

<Self-Contained Subframe Structure>

Figure 6:
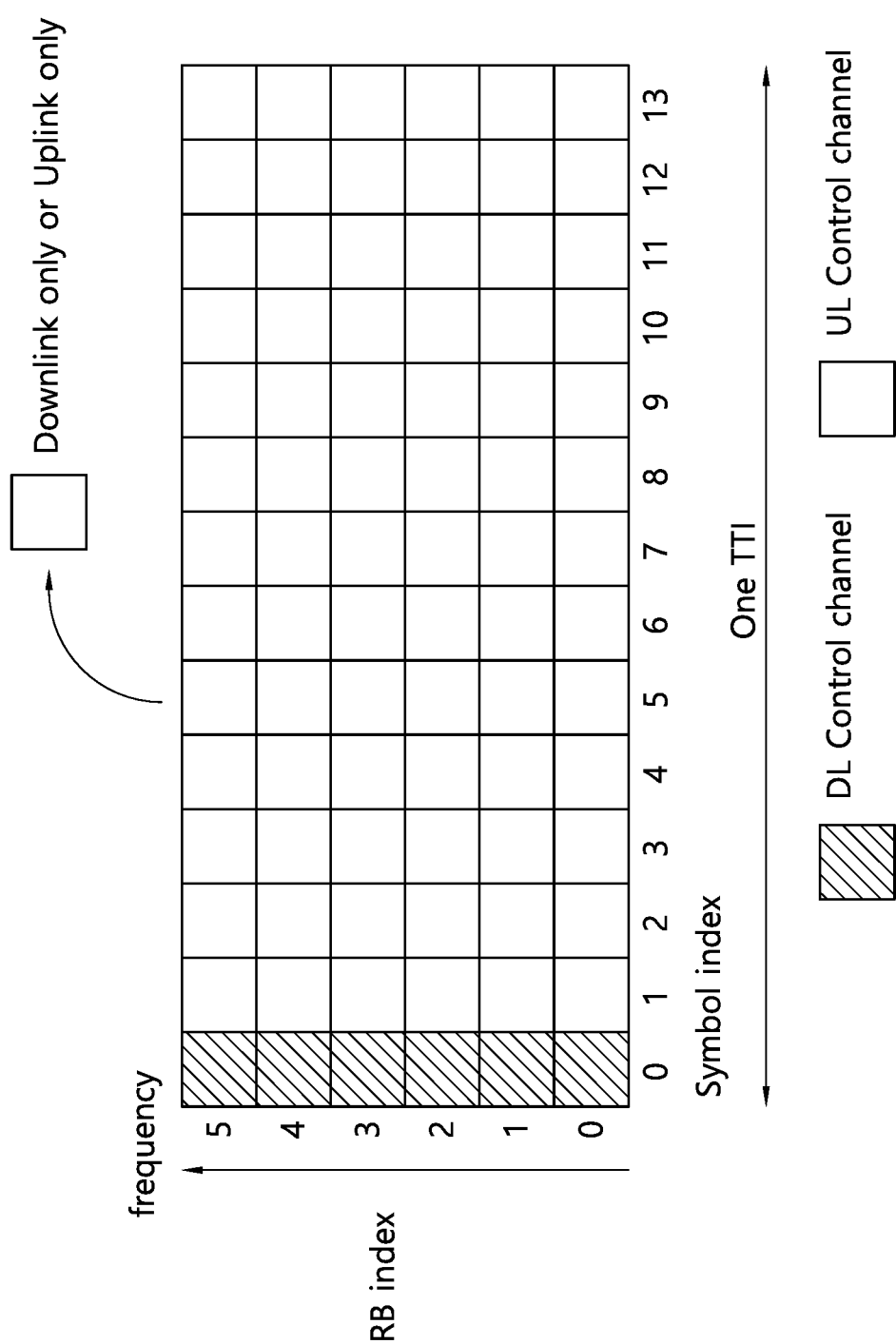
FIG. 6 illustrates an example of a frame structure that can be used in NR.

FIG. 6 illustrates an example of a frame structure that can be used in NR.

Figure 8:
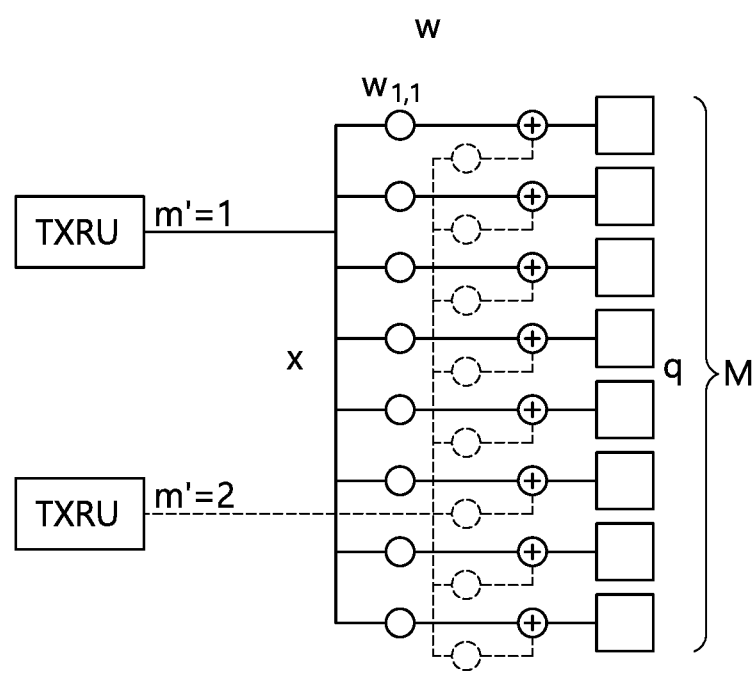

In NR, a structure in which a control channel and a data channel are time-division-multiplexed within one TTI, as shown in FIG. 8, can be considered as a frame structure in order to minimize latency.

In FIG. 6, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In these self-contained subframe structures, a time gap is required for a process in which a BS and a UE switch from a transmission mode to a reception mode or a process in which a BS and a UE switch from the reception mode to the transmission mode. To this end, some 01-DM symbols at the time of switching from a DL to a UL in a subframe structure may be set as a GP.

<Analog Beamforming #1>

Millimeter waves (mmW) have a short wavelength, in which a plurality of antenna elements can be installed in the same area. That is, a 30-GHz band has a wavelength of 1 cm, in which a total of 64 (8×8) antenna elements can be installed in a two-dimensional array at an interval of 0.5λ (wavelength) intervals on a panel of 4 by 4 cm. Therefore, in mmW, a plurality of antenna elements is used to increase a beamforming gain, thereby increasing coverage or increasing throughput.

In this case, when each antenna element has a transceiver unit (TXRU) in order to adjust transmission power and a phase, independent beamforming can be performed for each frequency resource. However, it is cost-ineffective to install a TXRU in each of the 100 antenna elements. Therefore, it is considered to map a plurality of antenna elements to one TXRU and to adjust the direction of a beam using an analog phase shifter. This analog beamforming method can create a beam in only one direction in the entire band and thus cannot achieve frequency-selective beamforming.

A hybrid beamforming having B TXRUs, where B is smaller than Q as the number of antenna elements, is considered as an intermediate form of a digital beamforming and an analog beamforming. In this case, although changing depending on the method for mapping the B TXRUs and the Q antenna elements, the number of directions of beams that can be simultaneously transmitted is limited to B or less.

Figure 7:
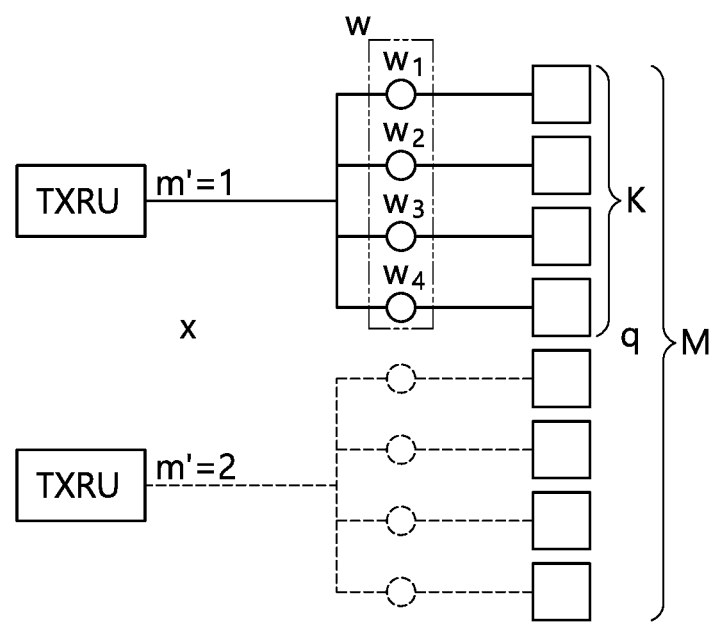
FIG. 7 and FIG. 8 show examples of a connection scheme of TXRU and antenna elements.

FIG. 7 and FIG. 8 show examples of a connection scheme of TXRU and antenna elements.

In this connection, the TXRU virtualization model represents the relationship between the output signals of the TXRU and the output signals of the antenna elements.

FIG. 7 shows a scheme by which the TXRU is connected to a sub-array. In this case, the antenna element is connected to only one TXRU. On the other hand, FIG. 8 shows a scheme by which the TXRU is connected to all antenna elements. In this case, the antenna element is connected to all TXRUs. In the figure, W represents the phase vector multiplied by the analog phase shifter. In other words, the direction of the analog beamforming is determined by W. In this connection, the mapping between the CSI-RS antenna ports and the TXRUs may be 1-to-1 or 1-to-many.

<Analog Beamforming #2>

When a plurality of antennas is used in NR, hybrid beamforming which is a combination of digital beamforming and analog beamforming may be used.

Here, analog beamforming (or RF beamforming) refers to an operation of performing precoding (or combining) at an RF end. In hybrid beamforming, a baseband end and an RF end perform precoding (or combining) and thus it is possible to achieve the performance similar to digital beamforming while reducing the number of RF chains and the number of D/A (or A/D) converters.

Figure 9:
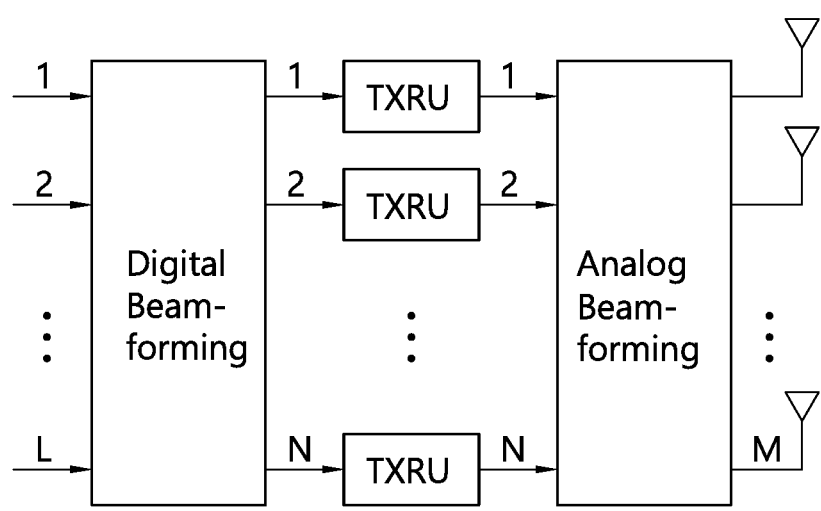
FIG. 9 is an abstract schematic diagram illustrating hybrid beamforming from the viewpoint of TXRUs and physical antennas.

FIG. 9 is an abstract schematic diagram illustrating hybrid beamforming from the viewpoint of TXRUs and physical antennas.

A hybrid beamforming structure can be represented by N transceiver units (TXRUs) and M physical antennas. Then, digital beamforming for L data layers to be transmitted by a transmission end can be represented by an N×L matrix, and N converted digital signals are converted into analog signals through the TXRUs and then analog beamforming represented by M×N matrix is applied to the analog signals.

In the NR system, base stations are designed to be able to change analog beamforming in units of symbols to support more efficient beamforming for terminals located in a specific area. Furthermore, a method of introducing a plurality of antenna panels to which independently hybrid beamforming is applicable is also considered in the NR system when N specific TXRUs and M RF antennas are defined as one antenna panel in FIG. 9.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 10:
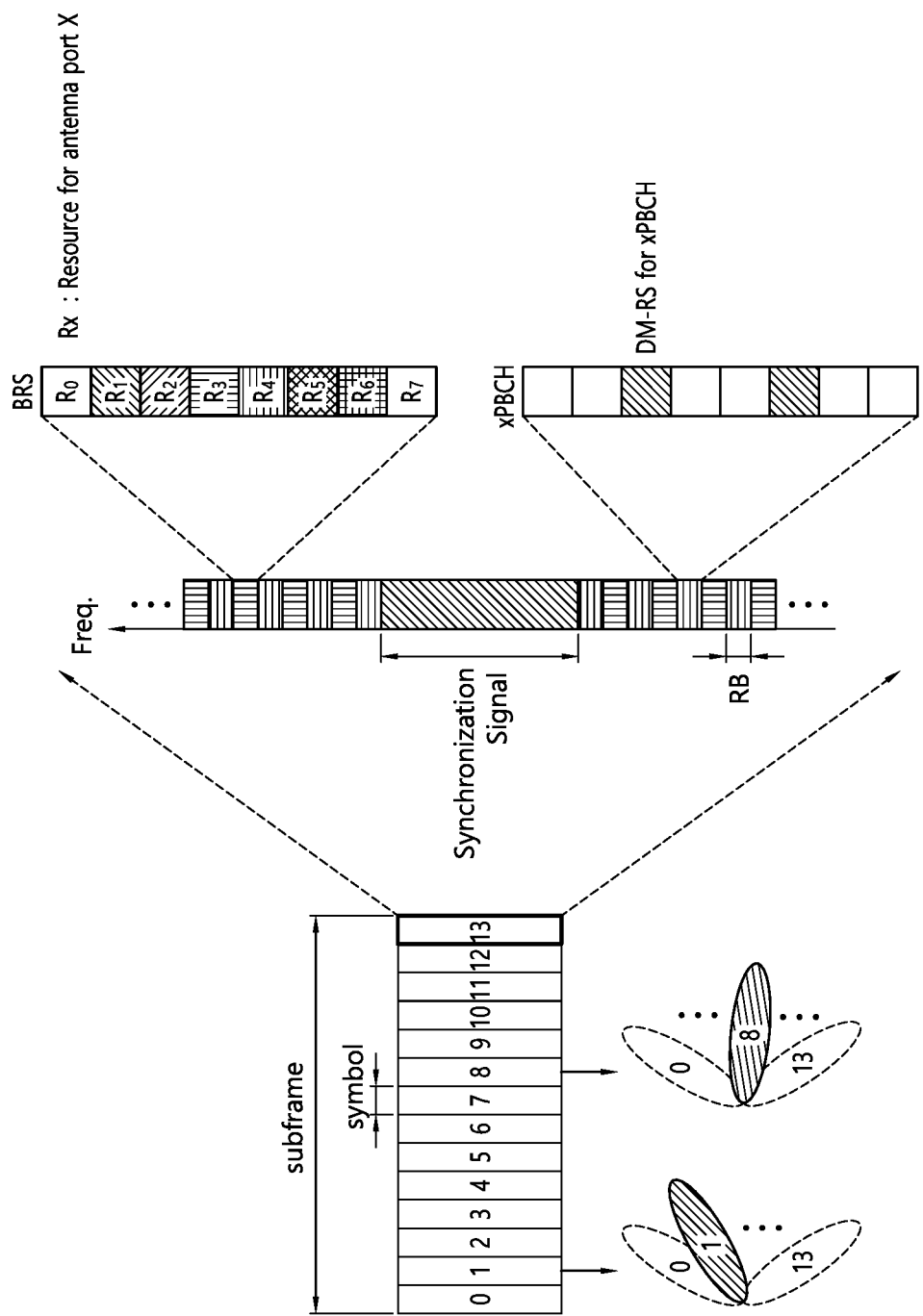
FIG. 10 illustrates the beam sweeping operation for a synchronization signal and system information in a downlink (DL) transmission procedure.

FIG. 10 illustrates the beam sweeping operation for a synchronization signal and system information in a downlink (DL) transmission procedure.

In FIG. 10, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 10, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

<Panel Array Antenna>

Figure 11:
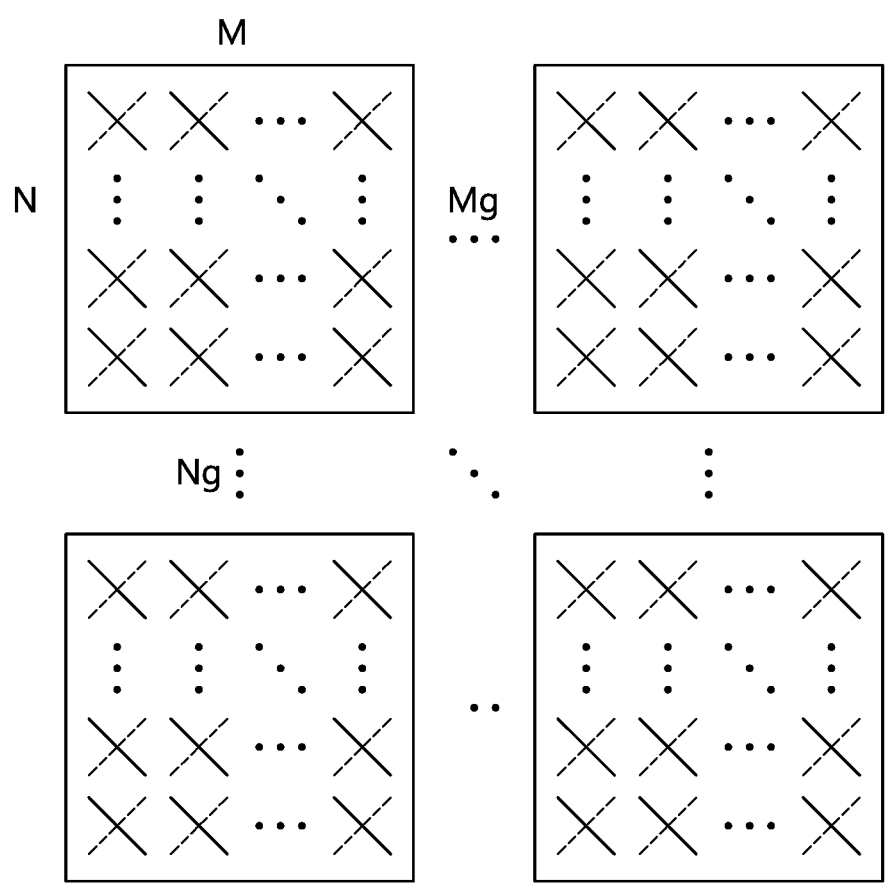
FIG. 11 shows an example of a panel antenna array.

FIG. 11 schematically shows an example of a panel antenna array.

According to FIG. 11, a generalized panel antenna array may be configured to have Mg and Ng panels in a horizontal domain and a vertical domain, respectively. One panel is configured to have M columns and N rows. The above example assumes an X-pol antenna. Therefore, the total number of antenna elements is 2*M*N*Mg*Ng.

<Channel State Information (CSI) Feedback>

In a 3GPP LTE(-A) system, a user equipment (UE) is configured to report channel state information (CSI) to a base station (BS) Channel state information (CSI) refers to information that may indicate the quality of a radio channel (or link) established between the user equipment and an antenna port.

For example, the channel state information (CSI) may include a rank indicator (RI), a precoding matrix indicator (PMI), a channel quality indicator (CQI), and the like. In this connection, RI denotes rank information of a channel. This is the number of streams that the user equipment receives using the same time-frequency resource. Since this value is determined in a dependent manner on the long term fading of the channel, the value is fed back from the user equipment to the base station in a longer period than a period for the PMI, and CQI. The PMI is a value reflecting the channel spatial characteristics and represents a precoding index preferred by the user equipment based on a metric such as a signal-to-interference-plus-noise ratio (SINR). The CQI is a value representing the intensity of the channel, and generally refers to a reception SINR as obtainable when the BS uses the PMI.

In the 3GPP LTE(-A) system, the base station configures multiple CSI processes to the user equipment. Then, a CSI for each process is sent from the UE to the base station. In this connection, the CSI process is composed of a CSI-RS for quality measurement of a signal from the base station and a CSI-interference measurement (CSI-IM) resource for interference measurement.

<Reference Signal (RS) Virtualization>

The PDSCH (Physical Downlink Shared Channel) transmission is possible only in one analog beam direction at a time-point by analog beamforming in mmW. Therefore, data from the base station may be transmitted to only a small number of user equipments in the corresponding direction. Therefore, when necessary, the analog beam directions may be differently configured between the antenna ports. This may allow simultaneous data transmission from the base station to multiple user equipments in multiple analog beam directions.

Figure 12:
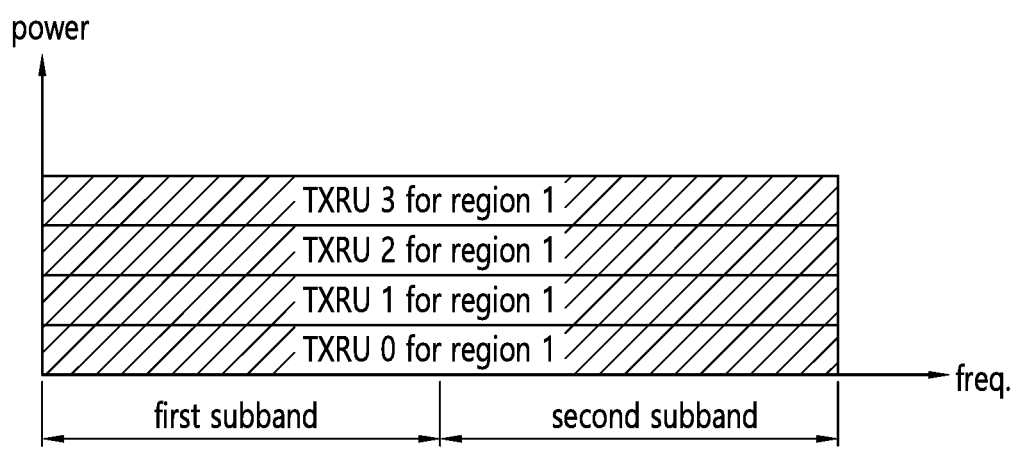
FIG. 12 shows schematically one example of a TXRU-specific service region when all TXRUs have the same analog beamforming direction.
Figure 13:
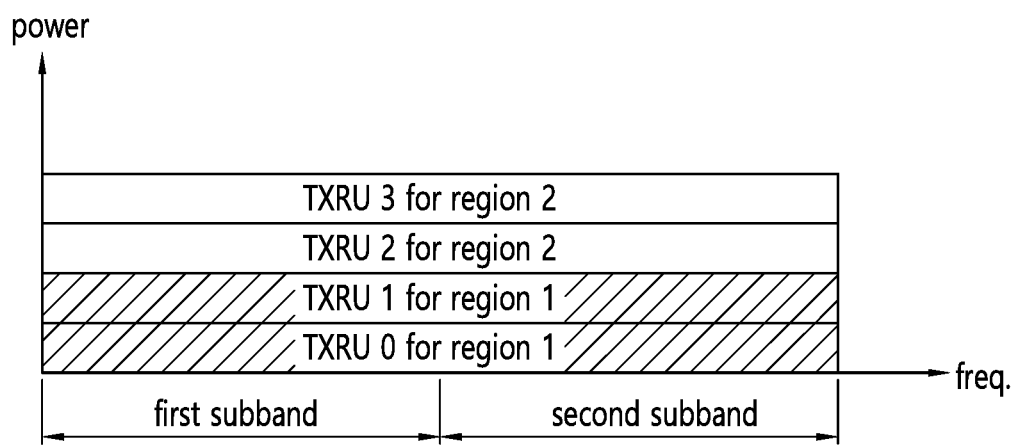
FIG. 13 shows schematically one example of a TXRU-specific service region when TXRUs have different analog beamforming directions.
Figure 14:
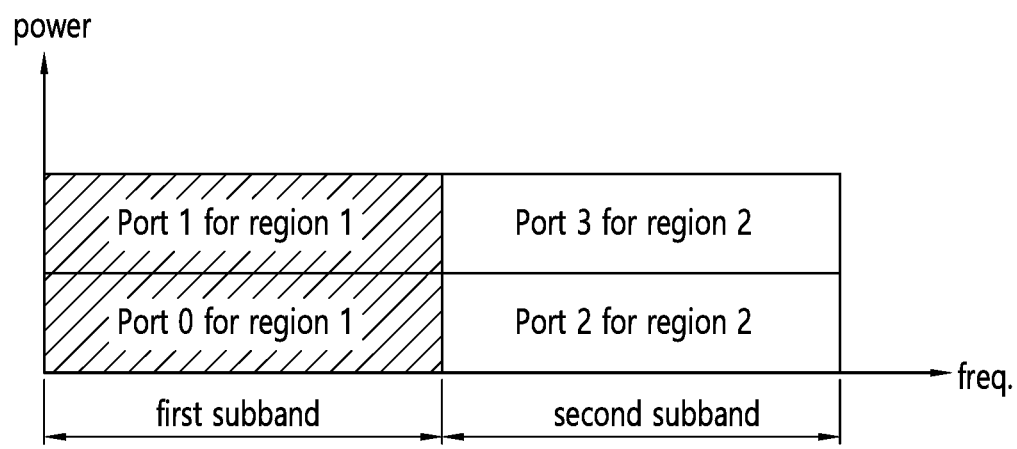
FIG. 14 is a schematic illustration of one example in which PDSCH1 transmitted to UE1 and PDSCH2 transmitted to UE2 are FDMed (Frequency Division Multiplexing) with each other and then transmitted.

Hereinafter, in an example, a structure in which four sub-arrays are formed by dividing 256 antenna elements into four sub-arrays and in which a TXRU is connected to a sub-array as shown in FIGS. 12 to 14 is exemplified.

When each sub-array is configured to have a total of 64 (8×8) antenna elements in a 2-dimensional array form, specific analog beamforming may cover a area corresponding to a 15-degree horizontal angle region and a 15-degree vertical angle region. That is, an area to be serviced by the base station is divided into a plurality of regions to be served, and a service is performed for each region one at a time. In a following example, it is assumed that a CSI-RS antenna port and a TXRU are 1-to-1 mapped to each other. Therefore, the antenna port and the TXRU have the same meaning in the following examples.

FIG. 12 shows schematically one example of a TXRU-specific service region when all TXRUs have the same analog beamforming direction.

As shown in FIG. 12, when all TXRUs (antenna ports, sub-arrays) have the same analog beamforming direction, a digital beam having a higher resolution may be formed to increase the throughput of the corresponding region. Furthermore, it is possible to increase the throughput of the corresponding region by increasing the rank of transmission data (RANK) to the corresponding region.

FIG. 13 shows schematically one example of a TXRU-specific service region when TXRUs have different analog beamforming directions.

When the TXRU (antenna ports, sub-arrays) have different analog beamforming directions as shown in FIG. 13, it is possible to simultaneously transmit data in a corresponding subframe (SF) to UEs distributed in a wider region. As shown in the figure, two of the four antenna ports may be used for PDSCH transmission to UE1 in region 1, while the remaining two may be used for PDSCH transmission to UE2 in region 2.

FIG. 14 is a schematic illustration of one example in which PDSCH1 transmitted to UE1 and PDSCH2 transmitted to UE2 are FDMed (Frequency Division Multiplexing) with each other and then transmitted.

FIG. 13 corresponds to an example in which PDSCH1 transmitted to UE1 and PDSCH2 transmitted to UE2 are SDMed (Spatial Division Multiplexing). Alternatively, as shown in FIG. 14, the PDSCH1 transmitted to the UE1 and the PDSCH2 transmitted to the UE2 may be FDMed (Frequency Division Multiplexing).

Between the scheme that services multiple regions simultaneously by dividing antenna ports and the scheme that services one region using all antenna ports, the preferred scheme is selected according to the RANK and MCS for servicing the UE in order to maximize the cell throughput. In addition, the preferred scheme may be selected according to the amount of data to be transmitted to each UE.

The base station calculates the cell throughput or scheduling metric that can be obtained when servicing a region using all antenna ports. The base station calculates the cell throughput or the scheduling metric that can be obtained when dividing the antenna ports and servicing the two regions. The base station compares the cell throughputs or scheduling metrics that can be obtained using the two schemes, and selects the final transmission scheme. As a result, the number of antenna ports participating in PDSCH transmission is changed SF-by-SR In order to calculate the transmission MCS of the PDSCH according to the number of antenna ports and to reflect this to the scheduling algorithm, CSI feedback appropriate for the purpose and from the UE is required.

<Phase Noise>

The jitter in the time axis is defined as the phase noise in the frequency axis. The phase noise changes randomly the phase of the time-axis reception signal as follows.

$$r_n = s_n e^{j\phi_n} \quad \text{[Equation 1]}$$

$$\text{where } s_n = \sum_{k=0}^{N-1} d_k e^{j2\pi \frac{kn}{N}}$$

In the Equation, $r_n$, $s_n$, $d_k$, $\phi_n$ represent a received signal, a time axis signal, a frequency axis signal, and a phase rotation value due to the phase noise, respectively. When the received signal goes through a discrete Fourier transform (DFT), this may be expressed as follows:

$$y_k = d_k \frac{1}{N}\sum_{n=0}^{N-1} e^{j\phi_n} + \frac{1}{N}\sum_{\substack{t=0\\t\neq k}}^{N-1} d_t \sum_{n=0}^{N-1} e^{j\phi_n} e^{j2\pi(t-k)m/N} \quad \text{[Equation 2]}$$

In the Equation, $$\frac{1}{N}\sum_{n=0}^{N-1} e^{j\phi_n}, \frac{1}{N}\sum_{\substack{t=0\\t\neq k}}^{N-1} d_t \sum_{n=0}^{N-1} e^{j\phi_n} e^{j2\pi(t-k)m/N}$$

denote a common phase error (CPE) and ICI, respectively. The greater the correlation between the phase noise and phase noise, the greater the value of the CPE.

<Phase Compensation Reference Signal (PCRS) Embodiment>

Figure 15:
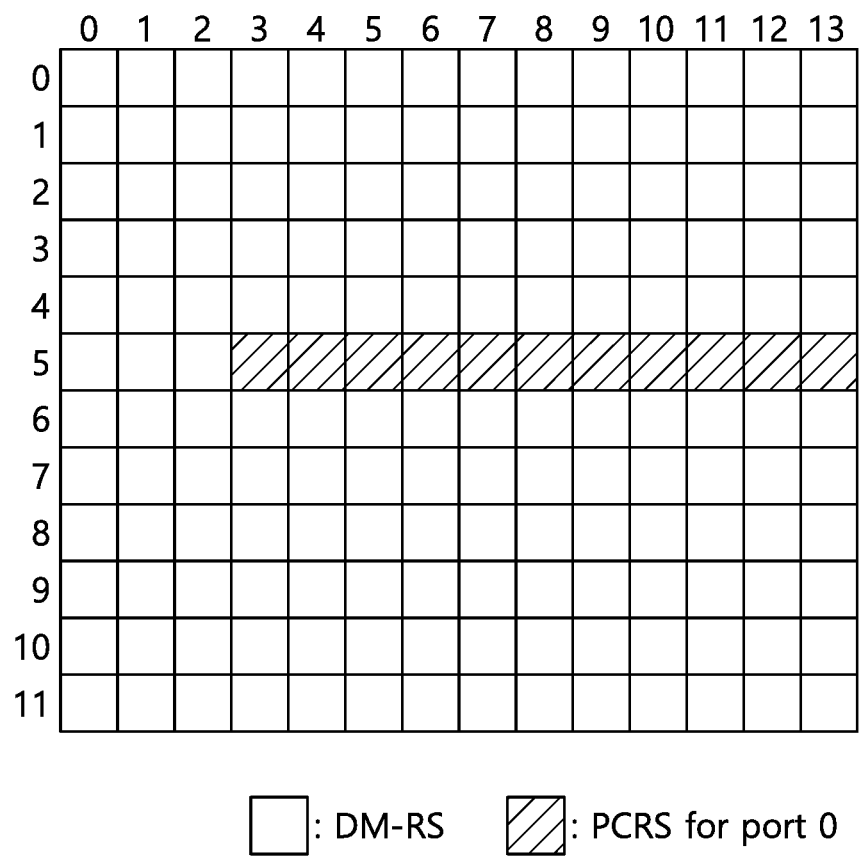
FIG. 15 outlines one example of PCRS.

FIG. 15 outlines one example of PCRS.

In FIG. 15, the PCRS of port 0 is defined in the 5th subcarrier. The PCRS is defined as a series of time axes consecutively. Therefore, the phase difference between different time-axis OFDM symbols can be estimated. The remainder excluding the demodulation reference signal (DMRS) and the PCRS represents a general PDSCH or PDCCH.

Hereinafter, the present disclosure will be described.

Following proposed schemes to be described below present methods for effectively transmitting uplink control information (UCI) using an uplink channel (for example, PUCCH/PUSCH) or an uplink signal under the NR system. The UCI may include at least one of, for example, acknowledgment/negative acknowledgment (ACK/NACK), channel state information (CSI), rank indication (RI), and precoding matrix indicator, channel quality indicator (CQI), and scheduling request (SR). In the present disclosure, the term "analog beam" may be interpreted in an extended manner as "(digital) beam (index)" and/or "reference signal resources (e.g., antenna port, layer index, (time/frequency) resource pattern) (index) (associated with beam (index)" and/or "(virtual) cell (identifier (/index))".

Figure 16:
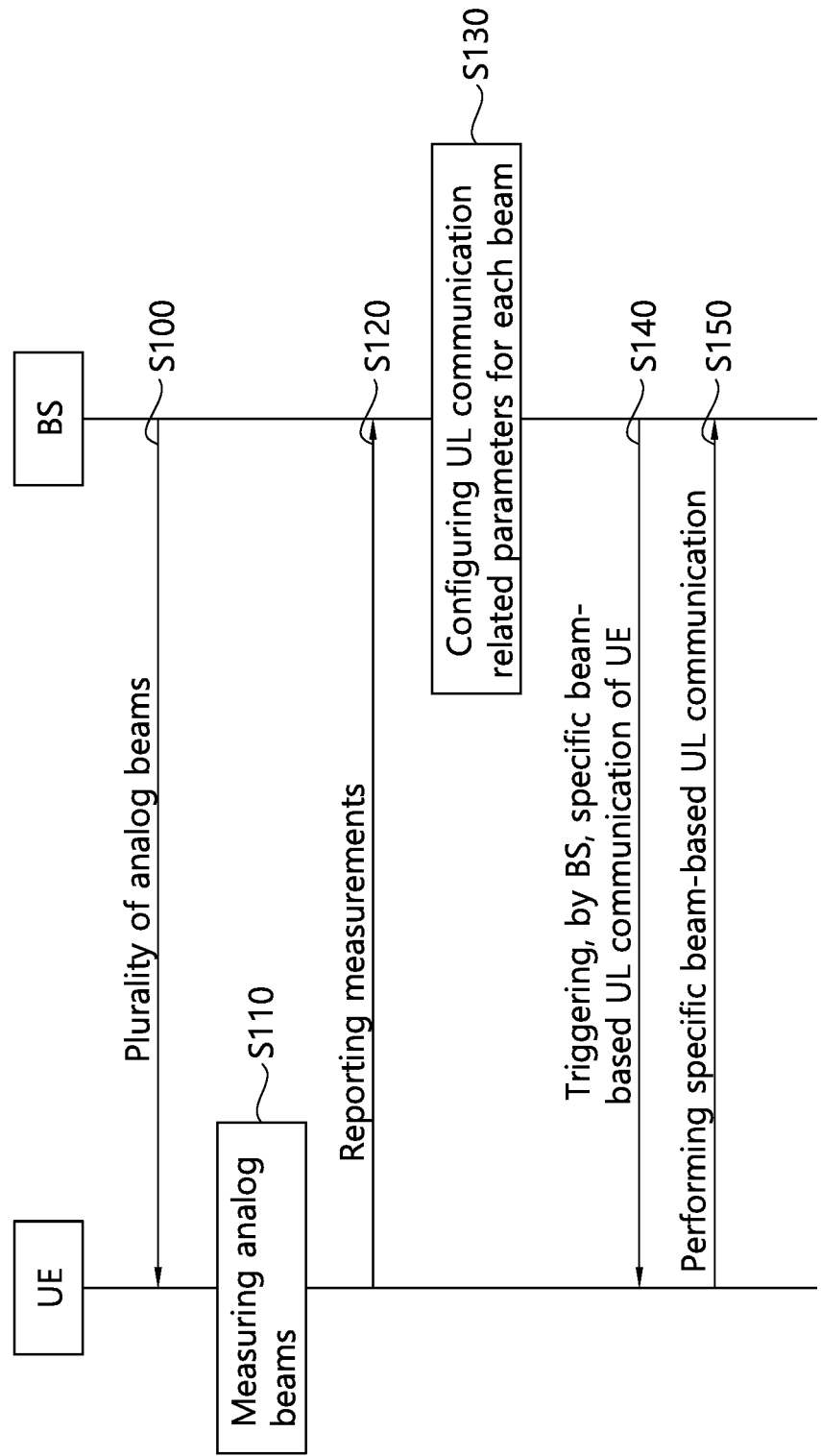
FIG. 16 illustrates the uplink communication execution method by the user equipment according to the present disclosure.

FIG. 16 illustrates the uplink communication execution method by the user equipment according to the present disclosure.

Referring to FIG. 16, the base station transmits a plurality of analog beams to the user equipment (S100). Each analog beam may include a beam reference signal (BRS). The beam reference signal may include a BRS ID (identity) that distinguishes the analog beam.

The user equipment measures the analog beams (S110) and reports the measurement results of the analog beams to the base station (S120). For example, the user equipment may report the beam reference signal received power (BRSRP) information of the beam reference signal included in each analog beam to the base station.

The base station refers to the measurement result and independently configures the uplink communication-related parameters for each of the analog beams (S130). The base station may trigger a specific analog beam-based uplink communication by the user equipment (S140). In this connection, the base station may signal to the user equipment the uplink communication-related parameters for each analog beam.

For example, the base station refers to the higher K "beam reference signal reception power (BRSRP) information" pre-measured/reported by the UE, and, thus, the base station configures/signals, for the user equipment, the M (for example, K≤M) analog beams (or beam reference signal (BRS) ID)-based uplink channel/signal Tx/Rx analog beams (or BSR IDs) switching operation.

For example, the base station may schedule (or trigger), for the user equipment, a specific analog beam (or BRS ID)-based uplink channel/signal transmission using pre-defined (physical layer) signaling.

The user equipment performs uplink communication through a specific analog beam (S150).

In this connection, different uplink power controls (PC) processes may be configured for/(associated with) (M) analog beams (or BRS IDs). In one example, the path loss (PL) value associated with a specific uplink power control process may be derived (/calculated) using measurements on BRS associated with the specific uplink power control process.

Furthermore, an independent (or separate) transmission power control (TPC) accumulation operation may be configured (/signaled) for each uplink power control process. A plurality (M) of analog beams (or BRS IDs) to be configured for (signaled to) the user equipment are of different (or the same) transmissions & reception points (TRP) or physical cells.

Hereinafter, a method for piggybacking and transmitting UCI on a PUSCH in NR will be exemplified. The UCI being piggybacked on the PUSCH means a scheme in which the UCI to be transmitted on the PUCCH is transmitted using the PUSCH together with the uplink data and the PUCCH transmission of the UCI is omitted.

[Proposed Method #1] The base station may configure/signal different PUSCH/PUCCH reception (/transmission)-related analog beams (or BRS IDs) via pre-defined (physical/higher layer) signaling-based analog beams (or BRS IDs) switching operation.

The base station may perform the pre-defined (physical/higher layer) signaling-based analog beams (or BRS IDs) switching operation (A) to reduce a loss due to the "power transient period" occurrence when a PUSCH/PUCCH transmission with different transmission power values (or with a power difference value greater than the pre-configured (/signaled) threshold value) on neighboring time (/frequency) resource regions, and/or (B) to assign different specific uplink channel/signal-related reception times differently (between analog beams (or BRS IDs)) with considering different (traffic) load state and resource utilization between analog beams (or BRS IDs).

When the corresponding analog beam (or BRS ID) switching operation is performed, and when the user equipment does not correctly understand (/receive) the (PUCCH UCI) PUSCH-piggyback operation-related intention (/indication) from the base station, (A) the user equipment is not only unable to perform a (PUCCH UCI)PUSCH-piggyback operation, but also, (B) the UE performs the PUCCH transmission in a direction other than the (actual) PUCCH reception (/transmission) analog beam (or BRS ID) direction as switched by the base station.

This error (/faulty) operation may (A) not only degrade the PUCCH reception (/transmission) performance of the corresponding user equipment, but also (B) may cause interference with PUCCH transmission/receptions of other user equipments being transmitted on different analog beams (or BRS IDs) (using PUCCH resources having partially or entirely overlapping positions).

In order to mitigate the above problem, among the plurality of states that the (PUCCH) UCI resource indicator (URI) field on the DCI format (for example, downlink grant) may point to, only the pre-configured (/pre-signaled) specific state may be assigned (via signaling) (A) a resource on a symbol index (SYMBOL # X) (this is called an exceptional resource or EX_UCIRSCE) different from a symbol index for remaining states (SYMBOL # Z) or (B) a resource on a symbol index different from a pre-configured (/signaled) ((PUCCH) URI resource specifying) candidate symbol index. Then, whether PUCCH UCI is PUSCH-piggybacked may be determined according to following rules (some of the rules). Characteristically, the "X" may be configured/(signaled) to have a relatively small index value than "Z". This means that SYMBOL # X precedes SYMBOL # Z on the time (resource) region.

The exceptional resource, i.e., the EX_UCIRSCE region, may be predetermined or may be configured by the base station.

Hereinafter, for convenience of illustration, it is assumed that SYMBOL # Z and SYMBOL # X are the last symbol and the next last symbol in the transmission time interval (TTI). The SYMBOL # Z and SYMBOL # X may be symbols included, a for example, in the scheduled PUSCH resource region. The EX_UCIRSCE (exceptional resource) may be configured (/signaled) in a user equipment specific or user equipments group specific manner.

When following Proposed Methods are applied, (A) the probability that the user equipment fails to receive the (PUCCH UCI) PUSCH-piggyback operation-related indication (/intention) indicated by the base station is lowered; (B) the probability that the UE will perform (PUCCH) UCI transmission in a different direction (PUCCH) than the direction of the reception analog beam (or BRS ID) assumed for (blind) reception (detection) of the corresponding (PUCCH) UCI by the base station even when the user equipment fails a (PUCCH) UCI PUSCH-piggyback-related UL grant reception is lowered.

When the EX_UCIRSCE (exceptional resource) is contained in the UE's PUSCH ((scheduled) resource) region, (A) the UE may be configured to always rate-match (uplink) data with considering the EX_UCIRSCE (exceptional resource) or (B) to puncture (PNG) the EX_UCIRSCE (exceptional resource) (always) after the UE has preferentially mapped the uplink data (without consideration of the EX_UCIRSCE (exceptional resource)).

Following Proposed Methods may be limitedly applied only when the PUSCH (resource) region and the PUCCH (resource) region are configured/signaled to be TDMed (time division multiplexing) and/or to be FDMed (frequency division multiplexing) or when OFDMA (and/or SC-FDMA)-based transmission is performed.

The following Proposed Methods may be limitedly applied only when the PUSCH data transmission and the transmission of the PUCCH UCI (which is a PUSCH-piggybacked target) are TDMed (and/or FDMed) on the same (or different) TTI.

Example #1-1

In one example, when the PUSCH-piggyback indication (PYG) field is defined in the DCI format (for example, UL grant), one of following three cases may be applied:

(CASE #1-1-A) When the PYG field indicates the (PUCCH UCI) PUSCH-piggyback operation and the PUCCH UCI-related (DL grant's) URI field (the PUCCH UCI becomes the piggybacked target) indicates EX_UCIRSCE (region), (PUCCH UCI) PUSCH-piggyback operation may be activated.

Figure 17:
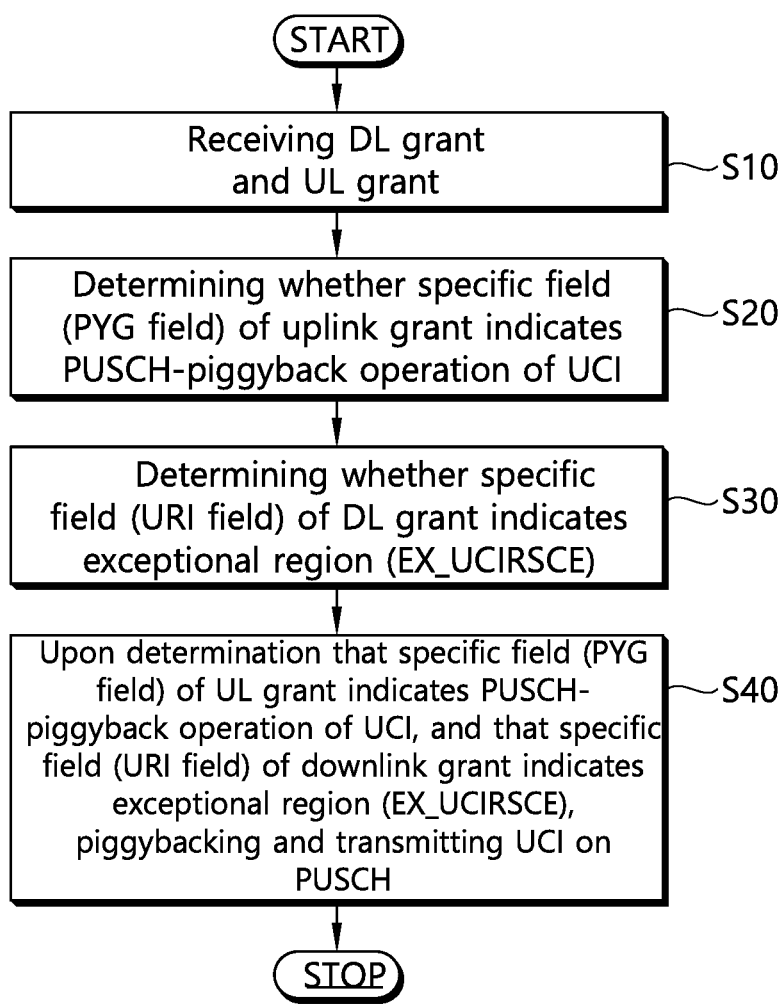
FIG. 17 shows a concrete application example of the CASE #1-1-A.

FIG. 17 shows a concrete application example of the CASE #1-1-A.

Referring to FIG. 17, the user equipment receives the downlink grant and uplink grant (S10). The user equipment determines whether the specific field (PYG field) of the uplink grant indicates a PUSCH-piggyback operation of the UCI (S20). The UE determines whether the specific field (URI field) of the downlink grant indicates the exceptional region (EX_UCIRSCE) (S30).

When the specific field (PYG field) of the uplink grant indicates the PUSCH-piggyback operation of the UCI, and when the specific field (URI field) of the downlink grant indicates the exceptional region (EX_UCIRSCE), the UE piggybacks and transmits the UCI on the PUSCH (S40).

According to this method, two conditions for the PUSCH-piggyback operation of UCI may be set forth as follows: i) a condition that the specific field (PYG field) of the uplink grant indicates the PUSCH-piggyback operation of the UCI; ii) a condition that the specific field (URI field) of the downlink grant indicates the exceptional region (EX_UCIRSCE). When both of the conditions are satisfied, the PUSCH-piggyback operation of UCI is performed by the UE. Therefore, this method may lower the error occurrence probability compared to a scheme of the PUSCH-piggyback operation of the UCI only when a pre-defined condition regarding the specific field (PYG field) of the uplink grant is satisfied (for example, when the PUCCH and PUSCH overlap (partially or entirely) in terms of the transmission time-point, the PUSCH-piggyback is performed).

For example, when the UE incorrectly decodes the value of the specific field (PYG field) in decoding the uplink grant, the UE may misinterpret that the PUSCH-piggyback operation of the UCI has been triggered though actually the PUSCH-piggyback operation of the UCI is not triggered. In this case, before the UE performs the PUSCH-piggyback operation of the UCI, the UE may check whether a condition that the specific field (URI field) of the downlink grant indicates the exceptional region (EX_UCIRSCE) is satisfied. Upon determination that the condition is not satisfied, the UE may not perform the PUSCH-piggyback operation of the UCI. Rather, the UE may transmit the UCI on the PUCCH.

Figure 18:
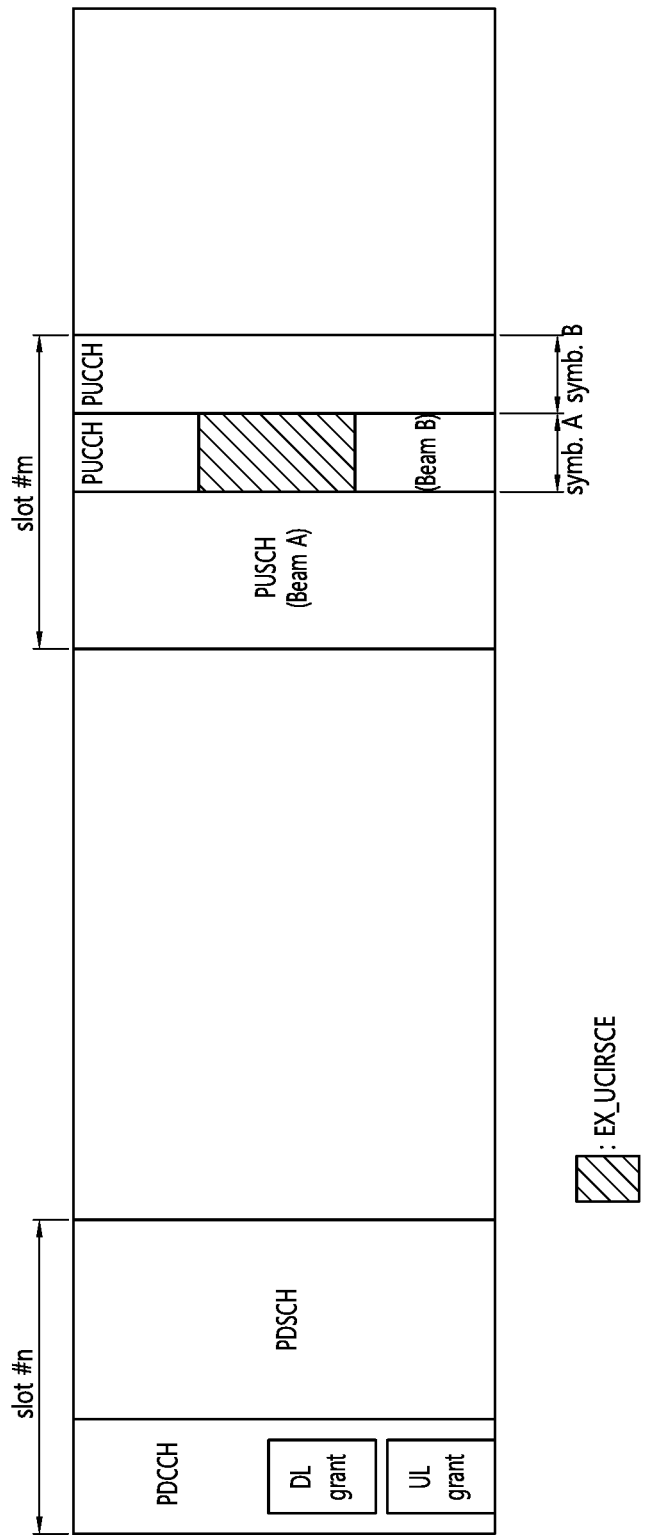
FIG. 18 is a specific example in which CASE #1-1-A is applied.

FIG. 18 is a specific example in which CASE #1-1-A is applied.

Referring to FIG. 18, the user equipment may also receive a downlink grant (DL-grant) and an uplink grant (UL-grant) in the PDCCH region of slot # n. The uplink grant may include a first field (PYG field) indicating the PUSCH-piggyback operation of the UCI. The downlink grant may include a second field (URI field) that indicates a specific resource.

The URI field may be composed of, for example, 2 bits. When the bit value of the URI field is 00, this indicates the exceptional resource (EX_UCIRSCE) positioned at symbol A of slot # m. Otherwise, when the value is 01, 10, or 11, this indicates the resource positioned at symbol B.

PUSCH may be transmitted using beam A. The PUCCH transmitted on the symbol A may be transmitted using beam B. The base station may attempt reception beam switching between PUSCH and PUCCH (symbol A).

When the first field (PYG field) of the uplink grant indicates a PUSCH-piggyback operation of the UCI, and, furthermore, when the second field (URI field) of the downlink grant indicates the exceptional region (EX_UCIRSCE), the UE may piggyback and transmit the UCI on the PUSCH.

When the first field (PYG field) of the uplink grant is not detected, and when the second field (URI field) of the downlink grant indicates the exceptional region (EX_UCIRSCE), the UE may piggyback and transmit the UCI on the PUSCH.

(CASE #1-1-B) When the PYG field indicates a PUSCH-piggyback operation of (PUCCH UCI), and when the PUCCH UCI-related (DL grant's) URI field (the UCI becomes the piggybacked target) indicates a PUCCH (UCI) resource other than the EX_UCIRSCE (region), the UE may transmit the PUCCH UCI using the PUCCH (UCI) resource (region) indicated by the URI field (in DL grant).

When the (CASE #1-1-A)/(CASE #1-1-B) rules are applied, whether the PUSCH-piggyback operation will be eventually applied may be determined based on whether the PUCCH UCI-related (DL grant's) URI field (the UCI being the piggybacked target) indicates the EX_UCIRSCE (region).

(CASE #1-1-C) When the PYG field does not indicate the PUSCH-piggyback operation of (PUCCH UCI) and when the PUCCH UCI-related (DL grant's) URI field (the UCI being the piggybacked target) indicates a PUCCH (UCI) resource (region) other than the EX_UCIRSCE (region) (or when the PYG field does not indicate (PUCCH UCI) PUSCH-piggyback operation, or when PUSCH data transmission is not indicated (/scheduled)), the UE may (always)

transmit the PUCCH UCI transmit using the PUCCH (UCI) resource (region) indicated by the URI field (of the DL grant).

Example #1-2

When the PYG field is not defined in the DCI format (for example, UL grant), the UE may operate as follows:

(CASE #1-2-A) When PUSCH data transmission and PUCCH UCI transmission are (concurrently) indicated in the same TTI (or pre-configured/signaled (PUCCH UCI) PUSCH-piggyback operation (time) duration), and when the PUCCH UCI-related (DL grant's) URI field indicates the EX_UCIRSCE (region), the UE may perform a PUSCH-piggyback operation of the corresponding PUCCH UCI.

(CASE #1-2-B) When PUSCH data transmission and PUCCH UCI transmission are (concurrently) indicated in the same TTI (or pre-configured/signaled (PUCCH UCI) PUSCH-piggyback operation (time) duration), and when the PUCCH UCI-related (DL grant's) URI field indicates a PUCCH (UCI) resource (region) other than the EX_U-CIRSCE (region), the UE may transmit the PUCCH UCI using the PUCCH (UCI) resource (region) indicated by the URI field (in the DL grant).

When the (CASE #1-2-A)/(CASE #1-2-B) rules are applied, (as in Example #1-1), whether the PUSCH-piggyback operation will be eventually applied may be determined based on whether the PUCCH UCI-related (DL grant's) URI field (the UCI being the piggybacked target) indicates the EX_UCIRSCE (region).

(CASE #1-2-C) when only the PUCCH UCI transmission is indicated (/scheduled) in the specific TTI (or pre-configured/signaled (PUCCH UCI) PUSCH-piggyback operation period), and when the PUCCH URI-related URI field (in the DL grant) indicates a PUCCH (UCI) resource other than the EX_UCIRSCE (or when the PUSCH data transmission is not indicated (/scheduled)), the UE may transmit the PUCCH UCI using the PUCCH (UCI) resource (region) indicated by the URI field (in DL grant).

[Proposed Method #2] When there are PUSCH data transmission at a specific time-point, and a plurality of PUCCH UCI transmissions on a pre-configured (signaled) specific (time) duration (referred to as VAL_TIMEWIN) in which the PUCCH UCI may be a potential (PUCCH UCI) PUSCH-piggybacked target, the PUSCH-piggybacked (PUCCH) UCI may be selected eventually based on following rules:

In one example, the corresponding PUSCH data transmission and the plurality of PUCCH UCI transmissions may be TDMed (and/or FDMed) on the same (or different) TTI.

Example #2-1

Among the PUSCH data transmission at a TTI # W time-point, and a plurality of PUCCH UCI transmissions on a pre-configured (signaled) specific (time) duration (referred to as VAL_TIMEWIN) in which the PUCCH UCI may be a potential (PUCCH UCI) PUSCH-piggybacked target, transmission for which the associated or related DL grant reception time-point is or is prior to TTI # time point (minimum processing time (MIN_PRCTIME)) for W-user equipment) (in this connection, in one example, the MIN_PRCTIME value means the minimum time required for operations such as channel estimation, data decoding, ACK/NACK (and/or CSI) information generation) may be subjected to the (PUCCH UCI) PUSCH-piggyback operation eventually.

VAL_TIMEWIN position (/region) of PUCCH UCI (transmission) (related) piggybacked on the PUSCH at the TTI # W time-point is set only to include or be prior to "TTI #(W-MIN_PRCTIME) (and/or TTI #(W-MINIMUM UCI FEEDBACK LATENCY))".

The non-PUSCH piggybacked (remaining) UCI may be transmitted using the PUCCH. When the corresponding rule is applied, depending on the MIN_PRCTIME value (of the user equipment), the number of PUCCH-UCIs as piggybacked may vary. The user equipment may use its pre-defined (higher (/physical) layer) signaling to inform the base station of its MIN_PRCTIME information.

Example #2-2

For all of the PUSCH data transmission at a TTI # W time-point, and a plurality of PUCCH UCI transmissions on a pre-configured (signaled) specific (time) duration (referred to as VAL_TIMEWIN) in which the PUCCH UCI may be a potential (PUCCH UCI) PUSCH-piggybacked target, (A) the associated or related DL grant reception time-points are or are prior to TTI # time point (minimum processing time (MIN_PRCTIME)), all of (corresponding) PUCCH UCIs to all of the transmission may be PUSCH-piggybacked. On the other hand, when (B) For some of the PUSCH data transmission at a TTI # W time-point, and a plurality of PUCCH UCI transmissions on a pre-configured (signaled) specific (time) duration (referred to as VAL_TIMEWIN) in which the PUCCH UCI may be a potential (PUCCH UCI) PUSCH-piggybacked target, the associated or related DL grant reception time-points are not or are not prior to the TTI # time point (minimum processing time (MIN_PRCTIME)), some of (corresponding) PUCCH UCIs to said some of the transmissions may not be PUSCH-piggybacked but be transmitted using the PUCCH.

The user equipment may use its pre-defined (higher (/physical) layer) signaling to inform the base station of its MIN_PRCTIME information.

[Proposed Method #3] When a PUSCH data transmission and a PUCCH UCI transmission having a power difference value greater than a pre-configured (/signaled) (allowable) threshold value are performed/scheduled on neighboring time/frequency resource regions respectively, the user equipment may be configured to PUSCH-piggyback the corresponding PUCCH UCI.

When the power difference value between the PUSCH data transmission and the PUCCH UCI transmission as performed on the neighboring time (/frequency) resource regions respectively is smaller than the pre-configured (/signaled) (allowable) threshold value, the corresponding UCI may be transmitted using the PUCCH.

(corresponding) PUSCH data transmission and PUCCH UCI transmission may be TDMed on the same TTI. When this rule is applied, this can also reduce the loss due to the occurrence of the power transition period.

Figure 19:
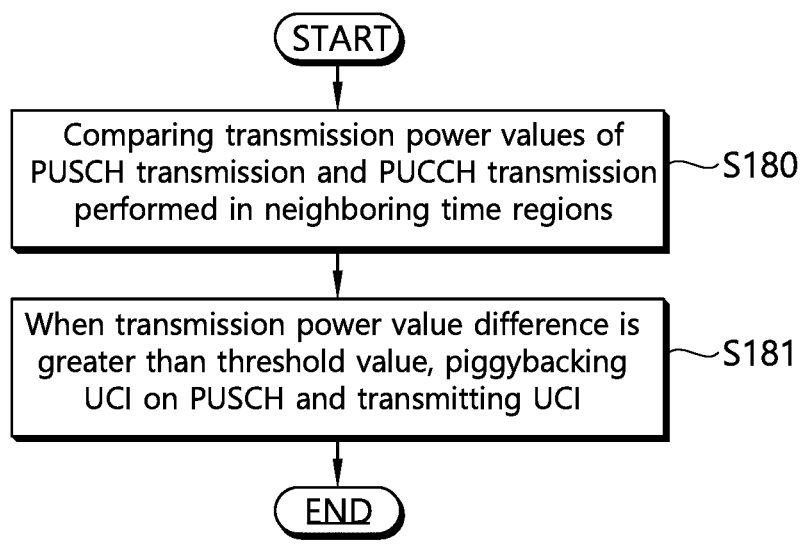
FIG. 19 shows the UCI transmission method according to the Proposed Method #3.

FIG. 19 shows the UCI transmission method according to the Proposed Method #3.

Referring to FIG. 19, the user equipment compares the transmission power values of the PUSCH transmission and the PUCCH transmission performed in the neighboring time regions respectively (S180). For example, the PUSCH transmission transmitted in symbol # n and the PUCCH transmission transmitted in symbol # n+1 in the same slot may be configured to have transmission power values of P_PUSCH and P_PUCCH, respectively. In this connection, the UE may determine whether the difference between P_PUCCH and P_PUSCH is greater than a threshold value.

When the transmission power value difference between the PUSCH transmission and the PUCCH transmission is greater than the threshold value, the UE may piggyback the UCI on the PUSCH and transmit the UCI (S181). Although not illustrated in FIG. 19, when the transmission power difference value between the PUSCH transmission and the PUCCH transmission is smaller than the threshold value, the UCI may be transmitted using PUCCH.

[Proposed Method #4] At least one of information indicated by following OPTIONs may be signaled using the (PUSCH data scheduling-related) UL grant.

(OPTION # A) Information about whether (PUCCH UCI) PUSCH-piggyback is applied (this is called PYG_UCION), (OPTION # B) Information about transmission timing (/time duration) of to-be-PUCCH-piggybacked (this is called PYG_UCIWIN), (OPTION # C) Information about to-be-PUCCH-piggybacked PUCCH UCI (transmission)-related DL grant reception timing (/time duration) (this is called PYG_DGWIN), (OPTION # D) Information about (PUCCH UCI) PUSCH-piggyback-related antenna port (this is called PYG_ANPORT), (OPTION # E) Information about (PUCCH) UCI PUSCH-piggyback transmission scheme (this is called PYG_TXSCH; for example, the UCI PUSCH-piggyback transmission scheme information include transmission diversity, e.g., SFBC), In one example, the (OPTION # D) (and/or (OPTION # E) and/or (OPTION # C) and/or (OPTION # B) and/or (OPTION # A)-related information (or some of the information) may be configured using higher layer signaling (e.g., RRC) rather than the UL grant.

The PYG_UCIWIN and/or PYG_DGWIN information may be offset values that are applied based on the PUSCH data transmission time-point (TTI # U) (or PUSCH data scheduling-related UL grant reception time-point (TTI # V)).

To allow the assumption (/understanding) of following numbers to be consistent between base station and user equipment: (A) the number of PUSCH-piggybacked (PUCCH) UCIs (within PYG_UCIWIN) (NUM_PYGUCI); and (B) the number of PUSCH-piggybacked (PUCCH) UCI-related DL grant number (within PYG_DGWIN) (NUM_PYGGRT), a field (e.g., with a form/role similar to the (legacy) UL DAI field) that indicates the number-related information may be additionally defined in a (PUSCH data scheduling-related) UL grant.

A field indicating which type or kind of the PUCCH UCIs (for example, ACK/NACK, CSI (RI/PMI/CQI), SR) among the PUCCH UCIs that are PUSCH-piggybacked targets will be selectively PUSCH-piggybacked may be additionally defined in a (PUSCH data scheduling-related) UL grant. There is an effect that the PUSCH data coding rate can be adjusted by using such a field.

When a data-free (PUSCH-based) UCI transmission is triggered (for example, when aperiodic CSI reporting is triggered), the (OPTION # A) and/or (OPTION # B) and/or (OPTION # C) and/or (OPTION # D) and/or (OPTION # E)-related information (or some of the information) may be signaled.

(Data-free) UCI transmission-related antenna port information and/or (data-free) UCI transmission scheme information may be additionally signaled via the corresponding DCI format. The corresponding information (or some of the information) may be configured using higher layer signaling (for example, RRC) rather than the DCI format.

When (PUCCH UCI) PUSCH-piggyback operation is indicated via the (PUSCH data (TTI # U) scheduling-related) UL grant (TTI # V), DL grant-related (PUCCH) UCI received (or (PUCCH) UCI transmitted) for a (time) duration from TTI # V to TTI #(U-MIN_PRCTIME) (or TTI #(U-MIN_PRCTIME−1)) or (TTI # U or TTL #(U−1)) may be PUSCH-piggybacked.

The PUSCH-piggyback operation of the corresponding (PUCCH) UCI may be limitedly applied only when the PUSCH data transmission and PUCCH UCI transmission are (concurrently) indicated (/scheduled) within the same TTI. The (corresponding) PUSCH data transmission and PUCCH UCI transmission may be TDMed on the same TTI.

[Proposed Method #5] When (A) the radio resource application is changed according to the load state and/or (B) the TTI structure type is changed, the TTI structure type of the PUCCH UCI transmission time-point is configured to have only a downlink channel (or to have no PUCCH (resource) region) using pre-defined physical (/higher) layer signaling (for example, DCI format) (and/or radio resources at the PUCCH UCI transmission time-point are configured to have only a downlink application). In this case, (assuming that the UL grant reception indicating the PUSCH-piggyback operation of the corresponding (PUCCH) UCI has failed), the user equipment may be configured to skip the corresponding UCI transmission via the PUCCH. The PUCCH UCI transmission time-point and the PUSCH-piggyback time-point (of the corresponding UCI) may be different from each other. The TTI structure type may be configured/signaled as one of "PDCCH+GP+PUSCH (+PUCCH)", "PDCCH+PDSCH", "PDCCH+PDSCH+ GUARD PERIOD (GP)+PUCCH (/PUSCH)", and "PDSCH (/PUSCH) only".

In one example, the PDSCH data scheduling-related DL grant may indicate a PDCCH (and/or PDSCH) transmission-capable position in the related (or associated) ACK/NACK bundling window, of a TTI # S at which the corresponding DL grant information is received.

When this rule is applied, the user equipment may know the corresponding DL grant (TTI # S)-related implicit (ACK/NACK) PUCCH resource position information. The base station may also (dynamically) change the reserved amount of implicit (ACK/NACK) (PUCCH) resource based on the TTI (structure) type configuration (and/or radio resource application configuration) in the related or associated ACK/NACK bundling window.

In the ACK/NACK bundling window, a TTI (for example, PUSCH ONLY structure)-related implicit (ACK/NACK) PUCCH resource which may not be used to transmit PDCCH (and/or PDSCH) may not be reserved.

Whether the implicit (ACK/NACK) PUCCH resource determination or explicit (ACK/NACK) PUCCH resource determination is applied may be determined based on whether the PUSCH resource region and a PUCCH resource region is TDMed (for example, explicit (ACK/NACK) PUCCH resource determination is applied) or is FDMed (for example, an implicit (ACK/NACK) PUCCH resource determination scheme is applied).

Following proposed schemes propose methods for efficiently mapping UCI-coded modulation symbols (called UCICM_SYM) onto PUSCH resources (regions) when the PUCCH UCI (for example, ACK/NACK, CSI (RI/PMI/CQI), SR, etc.) is PUSCH-piggybacked under the NR system.

In one example, in order to reduce and/or randomize the effect of interference between (neighboring) cells and interference between MULTI-USER (MU) MIMO-paired user equipments on the PUSCH-piggybacked (PUCCH) UCI, (A) UCICM_SYM mapping sequence (/direction) and/or (B) UCICM_SYM mapping resource position (/region) may be randomized or differently configured between the user equipments (and/or cells).

The corresponding randomization operation may be executed based on at least one of input parameters such as a user equipment identifier, a (physical) cell identifier, a pre-configured (signaled) (randomization-purposed) identifier, a (minimum) index of a (scheduled) PUSCH (data) transmission resource, or a random seed value.

In one example, a phase noise compensation reference signal (PCRS) is inserted in an uplink channel/signal (for example, PUSCH/PUCCH) (transmission). In this case, in order to reduce the interference effect of the PUSCH data between the MU MIMO-paired user equipment on PCRS and/or vice versa, the PUSCH-piggybacked (PUCCH) UCI (and/or (PUSCH) data) may be RNCed (and/or rate matched) in consideration of the all antenna ports-related resource elements of the PCRS. To avoid performance degradation of PUSCH-piggybacked (PUCCH) UCI due to the puncturing, the puncturing with considering all antenna port-related RE positions of the PCRS may not be applied, unlike the (PUSCH) data.

Figure 20:
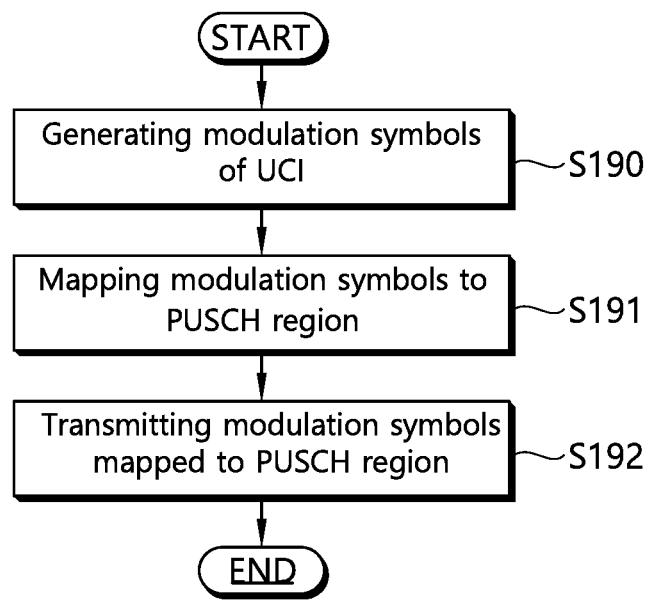
FIG. 20 illustrates the UCI transmission method according to the present disclosure.

FIG. 20 illustrates the UCI transmission method according to the present disclosure.

Referring to FIG. 20, the user equipment generates a UCI modulation symbol (UCICM_SYM) (S190). The modulation symbol is mapped by the UE to the PUSCH region (S191), and then the modulation symbol mapped to the PUSCH region is transmitted by the UE (S192).

A specific example of mapping the UCI modulation symbol to the PUSCH region is illustrated below.

[Proposed Method #6] Depending on rules or some thereof below, the UCICM_SYM may be mapped onto a PUSCH resource (region).

(A) A relatively highly important UCI (for example, ACK/NACK, and referred to as HPRI_UCI) may be mapped after a pre-mapped data (and/or UCI with relatively low importance (for example, RI/PMI/CQI, and referred to as LPRI_UCI) is punctured. (On the other hand) (B) After mapping the LPRI_UCI prior to the data, the data may be rate-matched with considering the LPRI_UCI mapping position) (and/or LPRI_UCI may be rate-matched with considering the HPRI_UCI mapping position).

Importance levels (between information) may be configured to have a following relation: DATA<PMI/CQI<RI<ACK/NACK.

(C) HPRI_UCI (for example, ACK/NACK/RI) may be mapped close to the reference signal (for example, DM-RS, PCRS) mapping position, as compared to the LPRI_UCI (for example, PMI/CQI). Thus, the channel estimation (/decoding) performance and phase noise compensation performance are improved.

The maximum number of UCICM_SYMs may be calculated as the product between the number of symbols to which the UCICM_SYM is mapped and the scheduled band (number of subcarriers) of the channel (for example, PUSCH) on which the UCI and data are transmitted (together). Independent (or separate) (channel) coding may be applied between RI UCICM_SYM and CQI/PMI UCICM_SYM.

Example #6-1

To increase at least one of the channel estimation (/decoding) performance and the phase noise compensation performance, the UCICM_SYM may be preferentially mapped to a location that is as close as possible to the mapping position of the reference signal (for example, DM-RS, PCRS).

Example #6-2

To reduce EXTRA (/OUTER)-POLATION-based channel estimation, UCICM_SYM may be preferentially mapped between the mapping (/symbol) positions of the reference signals (for example, DM-RS (/PCRS))

Example #6-3

To get the time diversity-gain (at the maximum degree), (time (/symbol)) spacing between the UCICM_SYMs mapped on the same frequency resource (for example, subcarrier) may be configured to be maximum.

Furthermore, to obtain the frequency diversity gain (to the maximum), (frequency (/subcarrier)) spacing between the UCICM_SYMs mapped onto the same symbol may be configured to be maximum.

The (frequency (/subcarrier)) spacings between the UCICM_SYMs mapped onto the same symbol may be configured differently between modulation (/multiple access) schemes being applied.

In one example, for OFDM (A), the (frequency (/subcarrier)) spacing between UCICM_SYMs (mapped on the same symbol) may be configured to be relatively large. For SC-1-DM (A), the (frequency (/subcarrier)) spacing between UCICM_SYMs (mapped on the same symbol) may be configured to be relatively small. This is intended for the purpose of maintaining low PAPR values (and/or single carrier characteristics).

Example #6-4

CSI (for example, RI/PMI/CQI) UCICM_SYM may be rate-matched with considering the maximum number of ACK/NACK UCICM_SYMs as calculated (or pre-configured) (this is referred to as MAX_ANNUM) and mapping positions of ACK/NACK UCICM_SYMs (this is referred to as MAX_ANRELO).

(When the PUSCH-piggybacked (PUCCH) UCI is transmitted together with (PUSCH) data), the data is mapped (preferentially) on the MAX_ANRELO. When the ACK/NACK information is actually PUSCH-piggybacked on MAX_ANRELO, the corresponding data may be punctured and mapped.

When this rule is applied, this may avoid the case where the relatively important ACK/NACK UCICM_SYM punctures CSI UCICM_SYM and is mapped.

When the UCI is transmitted without the (PUSCH) data (for example, when aperiodic CSI reporting is triggered), the CQI/PMI UCICM_SYM is mapped (preferentially) onto MAX_ANRELO. When the ACK/NACK information is actually PUSCH-piggybacked on MAX_ANRELO, the corresponding CQI/PMI UCICM_SYM may be punctured and mapped.

FIG. 21 to FIG. 28 illustrate cases where the UCICM_SYM is mapped based on the example rules (Example #6-1), (Example #6-2), (Example #6-3), (Example #6-4)) under various structures of the reference signals.

In FIG. 21 to FIG. 28, it is assumed that the number of ACK/NACK UCICM_SYMs (and/or MAX_ANNUMs), the number of RI UCICM_SYMs, and the number of CQI/PMI UCICM_SYMs are set to 16, 8, and 28, respectively. In addition, the number in the resource element means the sequence in which UCICM_SYM is mapped.

In FIG. 21 to FIG. 28, the reference signal in the horizontal direction may be interpreted as PCRS, and the reference signal in the vertical direction may be interpreted as DM-RS. Alternatively, the reference signal in the horizontal direction may be interpreted as DM-RS, and the reference signal in vertical direction may also be interpreted as DM-RS. In addition, the data mapping direction may be allocated in a frequency-first scheme (on the resource region other than the reference signal (mapping) position). That is, the subcarrier (/frequency) index may be allocated in a decreasing manner with starting with the minimum value of the symbol (/time) index and the maximum value of the subcarrier (/frequency) index. When the subcarrier (/frequency) index has a minimum value, the method may increase the symbol (/time) index by one. Again, the subcarrier (/frequency) index may be allocated in a decrementing manner from the maximum value of the subcarrier (/frequency) index.

Alternatively, the data mapping direction may be allocated in a time-first (TIME FIRST) scheme. That is, starting with the minimum value of the symbol (/time) index and the maximum value of the subcarrier (/frequency) index, the symbol (/time) may be allocated in a increasing manner. When the symbol (/time) index has the maximum value, the subcarrier (/frequency) index is increased by one. Again, the symbol (/time) index may be allocated in a increasing manner from the minimum value of the symbol (/time) index.

Figure 21:
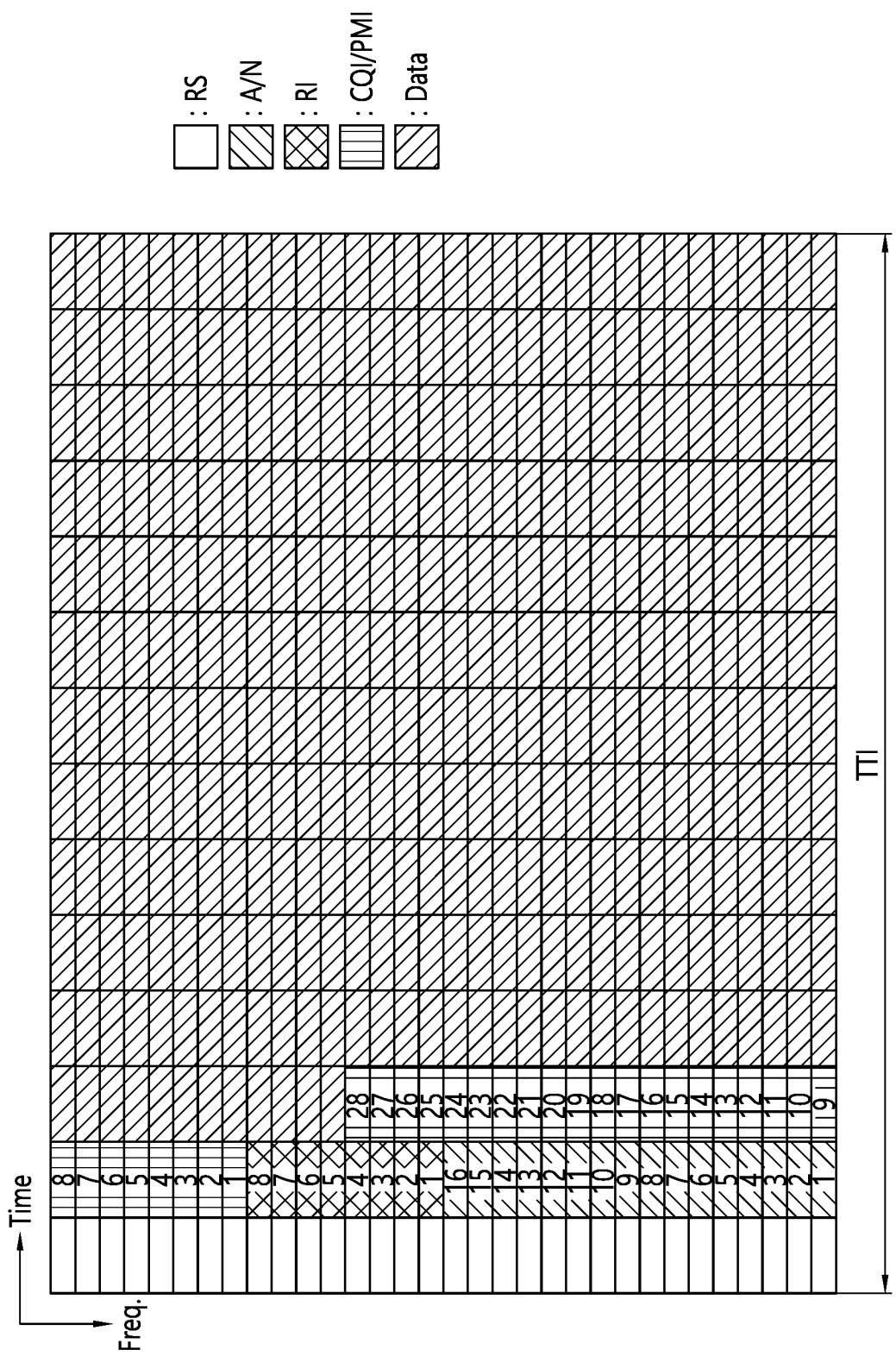
FIG. 21 to FIG. 28 illustrate cases where the UCICM_SYM is mapped based on the example rules (Example #6-1), (Example #6-2), (Example #6-3), (Example #6-4)) under various structures of the reference signals.

FIG. 21 shows an example in which ACK/NACK, RI, and CQI/PMI are mapped/allocated in a frequency-first scheme. That is, ACK/NACK, RI, and CQI/PMI are first sequentially allocated to subcarriers positioned in the same symbol. When ACK/NACK, RI, and CQI/PMI are not allocated to the same symbol, ACK/NACK, RI, and CQI/PMI are allocated to the subcarriers positioned at the next symbol.

Figure 22:
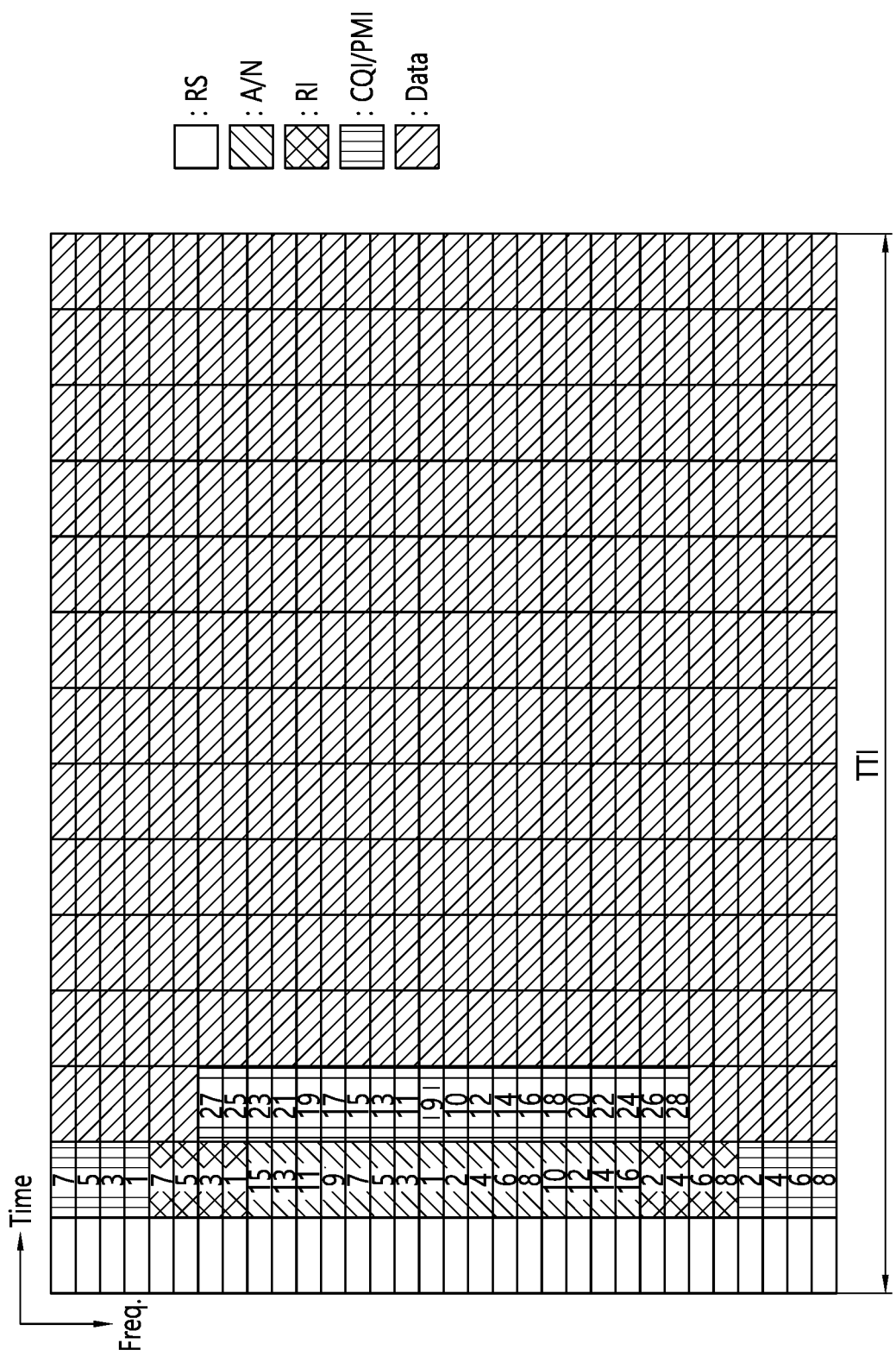

FIG. 22 shows an example of a frequency-based symmetric UCI mapping/allocation around the frequency center of the entire resource region to which UCI and data are mapped.

Figure 23:
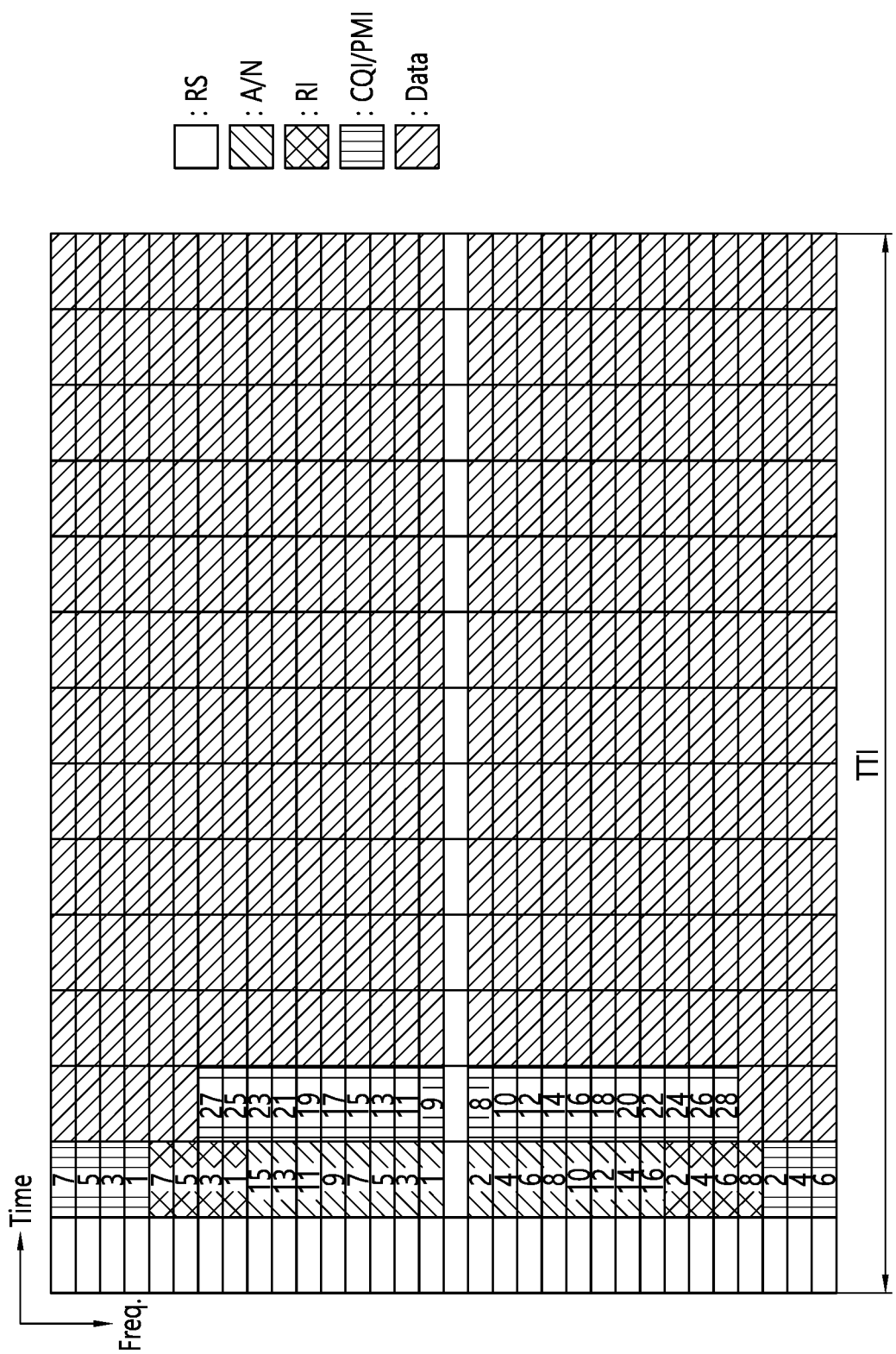

FIG. 23 shows an example of a frequency-based symmetric UCI mapping/allocation around the reference signal of the entire resource region to which UCI and data are mapped.

As shown in FIG. 23, the modulation symbols of the UCI may be mapped to the PUSCH region symmetrically around the specific frequency in the frequency region.

In this connection, the PUSCH region is originally a region for uplink data transmission. This region may contain symbols other than the first symbol in the subframe (this may be the case in FIG. 21 to FIG. 28).

The specific frequency may be a subcarrier to which a phase interference compensation reference signal (PCRS) is mapped. The PCRS may be mapped equally to the specific frequency in successive time durations constituting the PUSCH region. The UCI, for example, ACK/NACK (acknowledgment/negative-acknowledgment) may be preferentially mapped to a resource element (RE) neighboring to the PCRS.

Moreover, a demodulation reference signal (DM RS) may be mapped to a first symbol of a subframe including the PUSCH region. In this case, the UCI may be first mapped to the second symbol neighboring to the first symbol corresponding to a position of the DM RS in the time region. In this connection, the UCI may include at least one of ACK/NACK (acknowledgment/negative acknowledgment), rank indication (RI), precoding matrix indicator (PMI), and channel quality indicator (CQI). This may be equally applied to FIG. 21 to FIG. 28.

In one example, an ACK/NACK may be mapped after puncturing data mapped to the PUSCH region and/or other UCIs (RI/PMI/CQI) with relatively low importance. The UCI (RI/PMI/CQI) with relatively low importance may be mapped to PUSCH region in a prior timing to the data mapping. The data may be rate-matched (RM) with considering the mapping position of the relatively less important UCI. This may be equally applied to FIG. 21 to FIG. 28.

Figure 24:
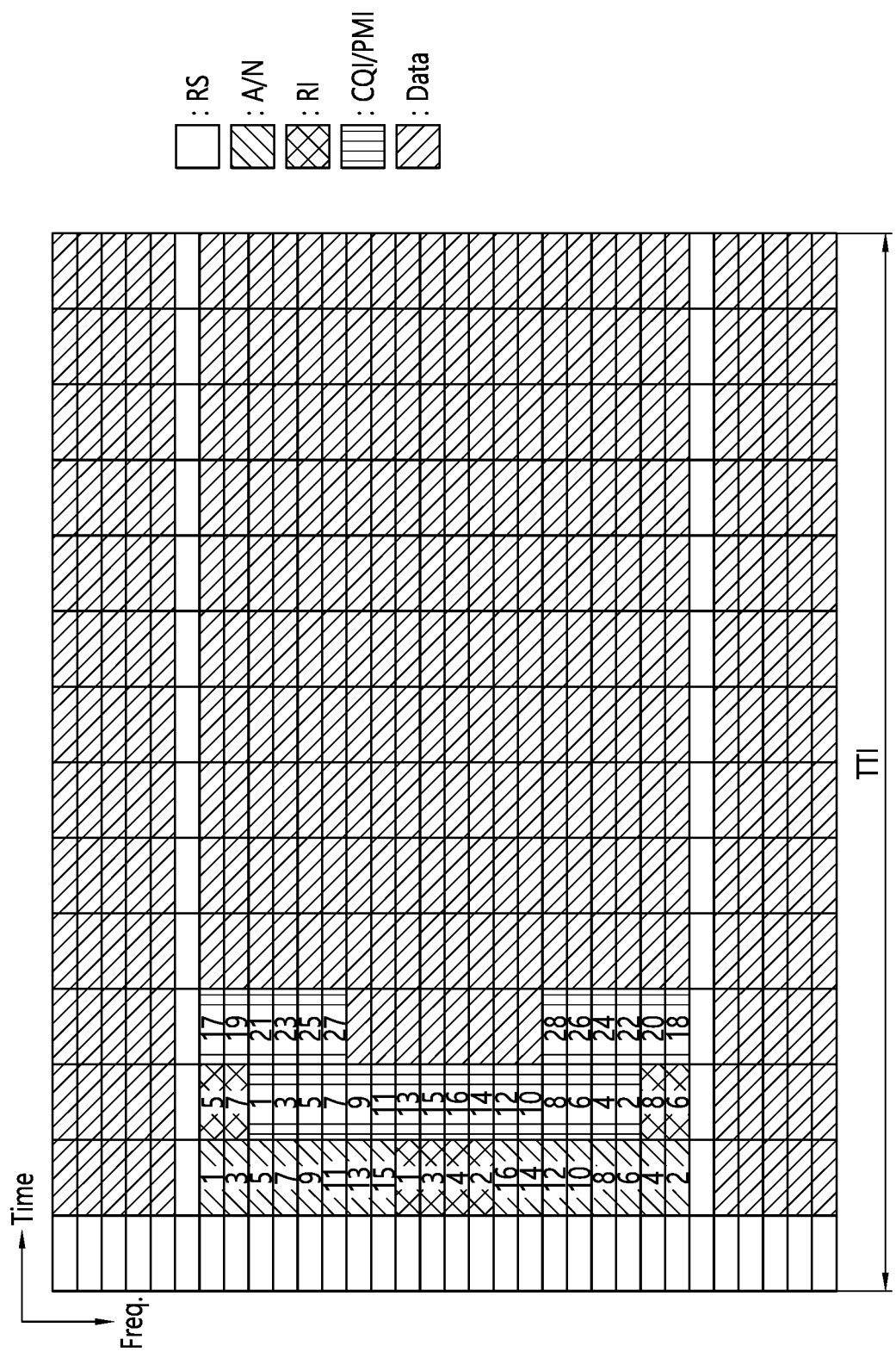
Figure 25:
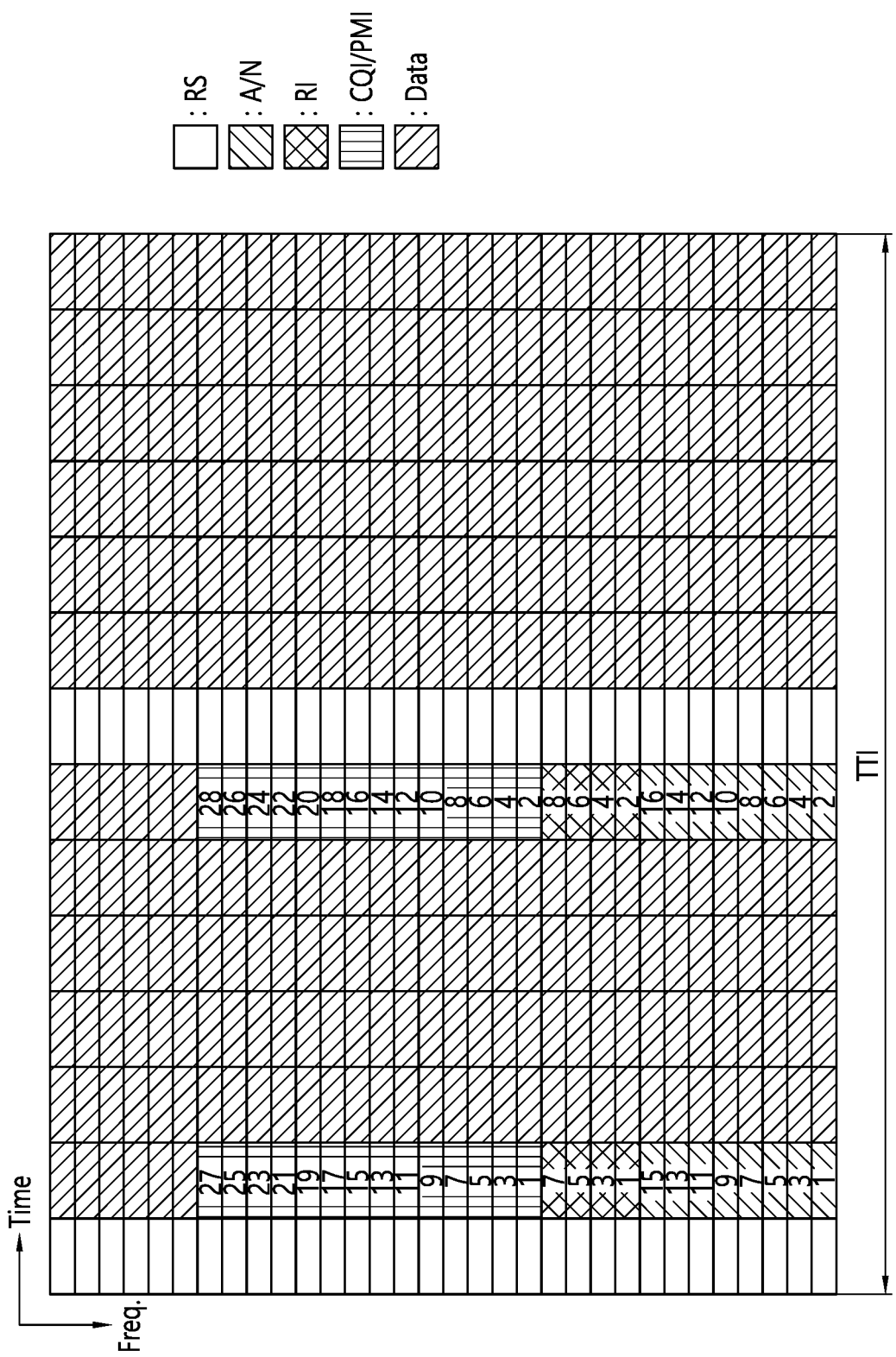

In FIG. 24, UCI is frequency-based symmetrically mapped/allocated. ACK/NACK is mapped/allocated only to one symbol. RI, CQI/PMI are mapped/allocated to multiple symbols In FIG. 25, the UCI is mapped/allocated to two symbols. ACK/NACK, RI, and CQI/PMI are all mapped/allocated to each symbol. Each of ACK/NACK, RI, and CQI/PMI is allocated to each of consecutive subcarriers in each symbol.

Figure 26:
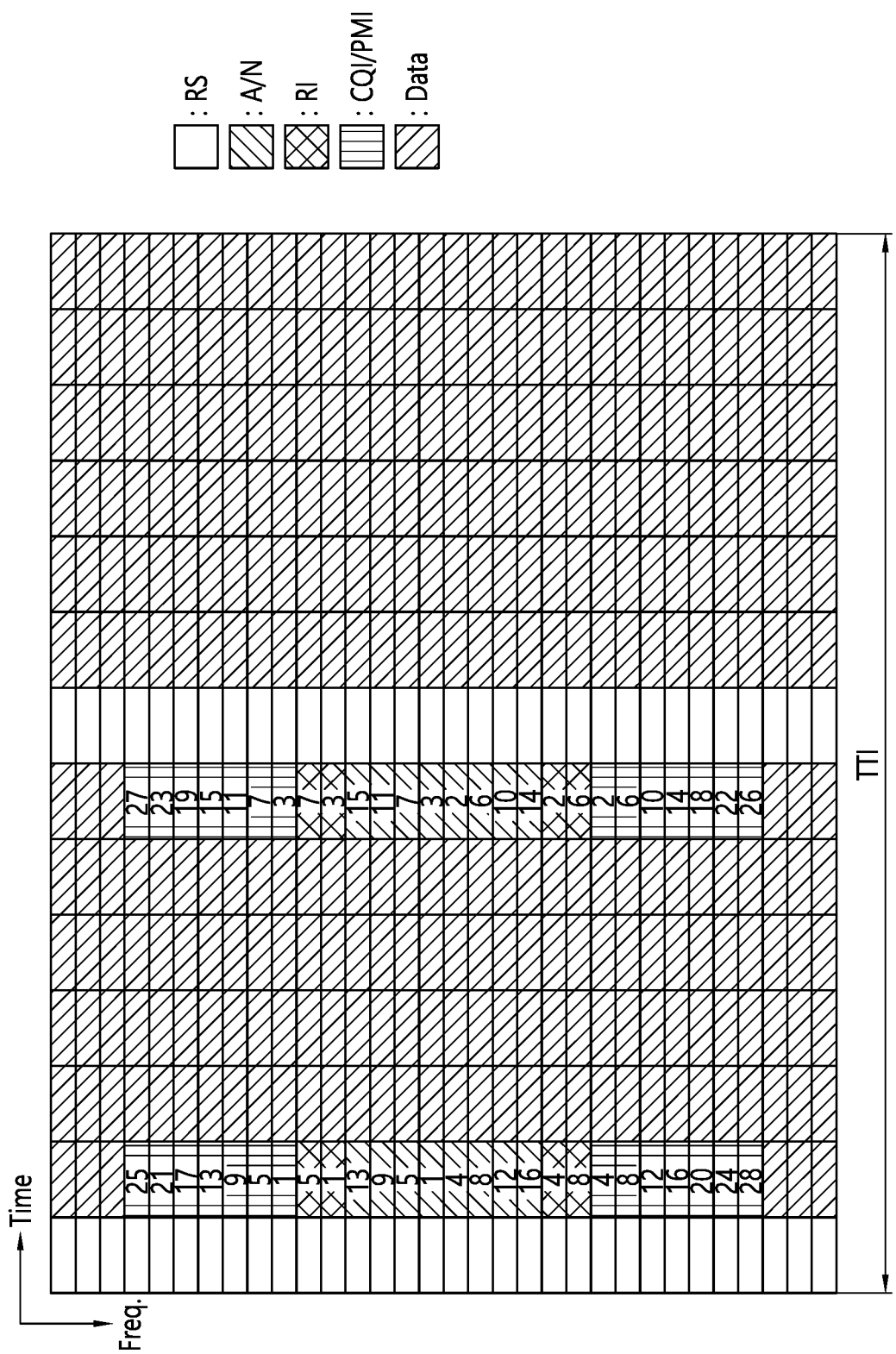

In FIG. 26, the mapping/allocation of UCI to two symbols is shown. ACK/NACK, RI, and CQI/PMI are all mapped/allocated to each symbol. Each of RI, CQI/PMI may be allocated to each of subcarriers spaced within each symbol.

Figure 27:
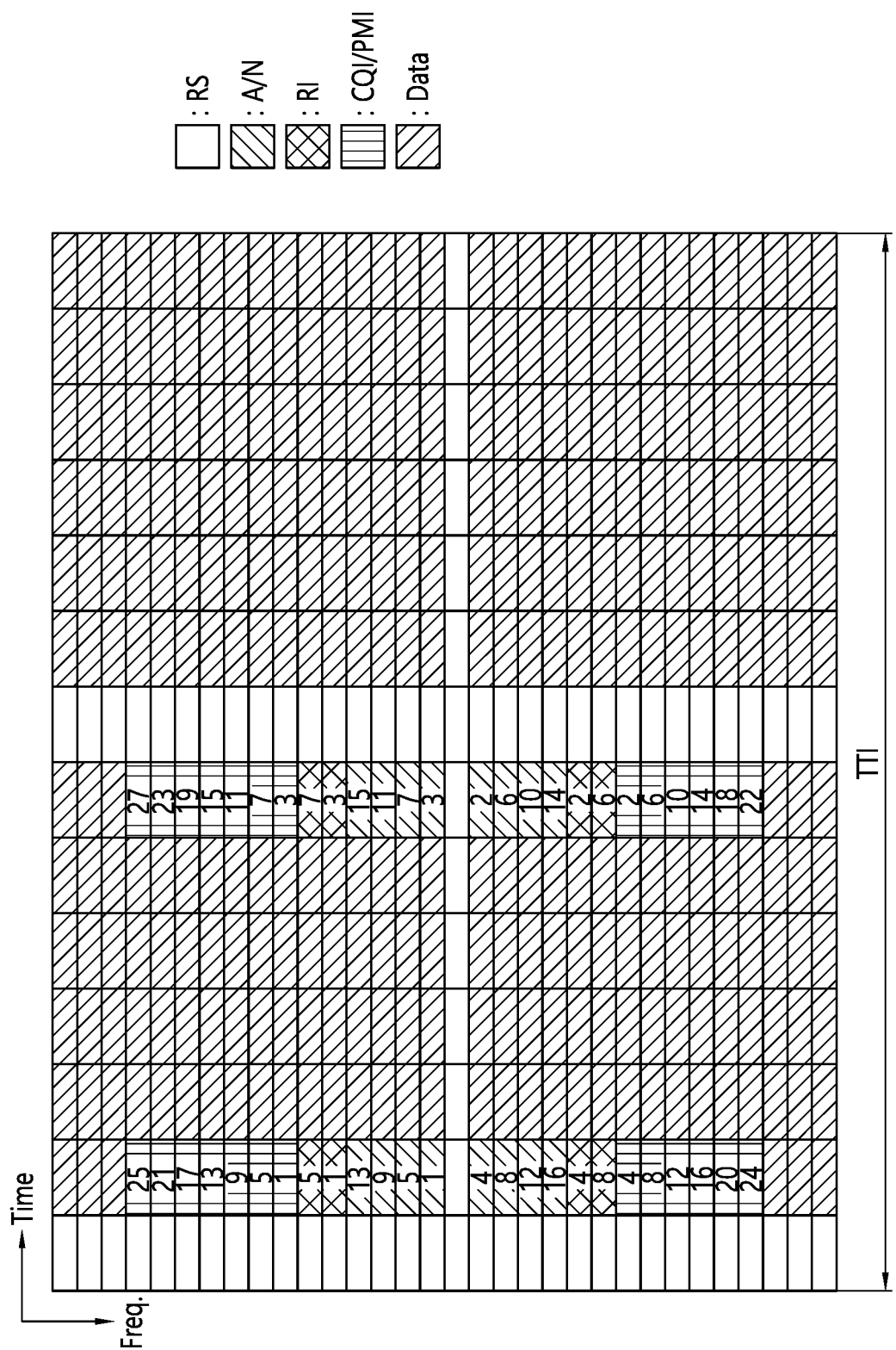

FIG. 27 shows the mapping/allocation of UCI to two symbols, where all ACK/NACK, RI, and CQI/PMI are mapped/allocated to each symbol, and are frequency-based symmetrically mapped/allocated around the reference signal.

Figure 28:
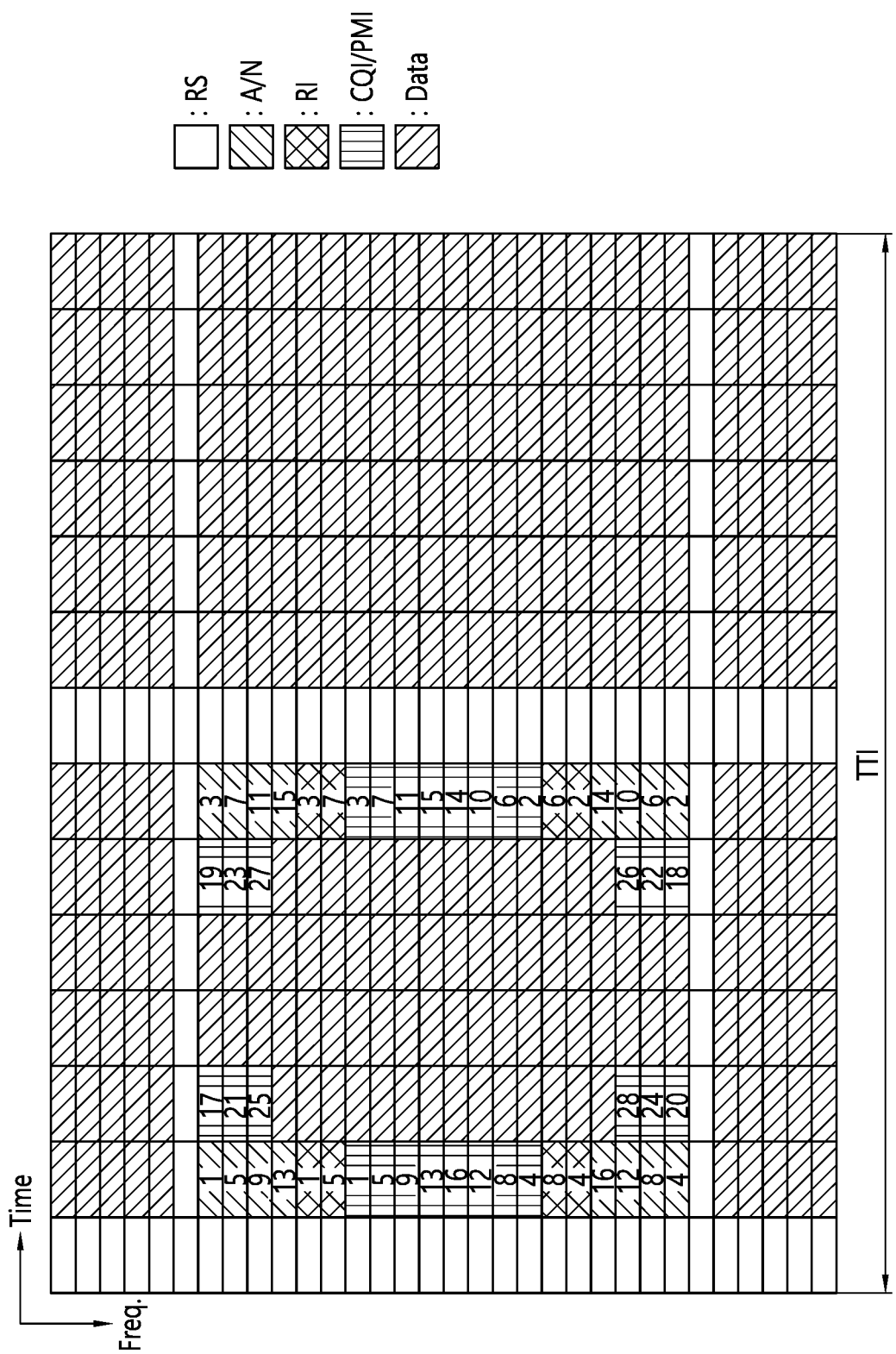

In FIG. 28, each of ACK/NACK, RI, and CQI/PMI is mapped to at least two symbols. For example, ACK/NACK, RI may be mapped to two symbols, and CQI/PMI may be mapped/allocated to four symbols. Within each symbol, ACK/NACK, RI, and CQI/PMI may be frequency-based symmetrically mapped/allocated. ACK/NACK, RI, and CQI/PMI may be mapped/allocated to the frequency region between the reference signals.

When a data-free (PUSCH-based) UCI transmission is triggered (for example, when aperiodic CSI reporting is triggered), the UCICM_SYM mapping may be executed according to the above-illustrated rules or some thereof (for example, (Example #6-1), (Example #6-2), (Example #6-3), (Example #6-4)).

The mapping of ACK/NACK UCICM_SYM and RI UCICM_SYM is performed in the same manner as in any of FIGS. 16 to 23. (On the other hand), the CQI/PMI UCICM_SYM mapping may be performed in a frequency-first (or time-first) scheme on the resource region except for the reference signal (mapping) position.

When PUSCH-piggybacked (PUCCH) UCI is transmitted in a plurality of antenna ports (for example, PORT # X/Y)-based transmission diversity (for example, SFBC) scheme, an antenna port index (to be used for UCI transmissions) may be mapped cyclically on a resource element basis. For example, the RE #(K+1) and RE #(K−1) adjacent to the RE # K to which the PORT # X is mapped may be mapped to another PORT # Y. In one example, when a UCI transmission (as PUSCH-piggybacked) is performed using PORT # X on RE # K, data transmission may be performed using another PORT # Y on the same RE # K.

When PUSCH-Piggybacked (PUCCH) UCI (PYG_UCI) and (PUSCH) data (PU_DATA) are transmitted in a plurality of antenna ports (for example, PORT # X/Y)-based transmission diversity scheme, the PYG_UCI and PU_DATA transmission may be performed cyclically on a resource element basis in order to increase the frequency diversity gain. For example, when PYG_UCI transmission is performed on RE # X, PU_DATA transmission may be performed using the neighboring RE #(X+1), and RE #(X−1).

UL control channel (PUCCH)-related structure and transmission method thereof will be described. Hereinafter, the short duration uplink control channel (SHORT DURATION UC_CHANNEL) and the long duration uplink control channel (LONG DURATION UC_CHANNEL) are referred to as SHD_PUCCH and LNG_PUCCH, respectively. When, from the viewpoint of the system (/cell) (and/or user equipment), the SHD_PUCCH and/or LNG_PUCCH are multiplexed with the uplink data channel (PUSCH) on the (frequency (/time) region, following illustrated methods may also be applied.

At least two transmission methods may be supported for the NR-based uplink control channel.

1) An uplink control channel may be transmitted in a short duration. Specifically, an uplink control channel may be transmitted near the uplink symbol of the last transmitted slot. The UL control channel may be TDMed and/or FDMed with an uplink data channel.

2) An uplink control channel may be transmitted in a long duration. An uplink control channel may be transmitted across a plurality of uplink symbols to extend the coverage. The UL control channel may be FDMed with the uplink data channel in the slot.

When hopping is used, the frequency resource and hopping may not be spread across the carrier frequency.

[Proposed Method #7] (Serving) base station uses the pre-defined (dynamic) indicator (referred to as SHD_RS-INDI) to indicate the SHD_PUCCH resource region with which (scheduled) PUSCH may be rate-matched (RM) or punctured (PNG).

The user equipment performs (last) PUSCH transmission after the PUSCH rate-matching (puncturing) application to the SHD_PUCCH resource region indicated by SHD_RS-INDI.

The (corresponding) SHD_RSINDI may indicate one (or more) of the pre-configured plurality of SHD_PUCCH resource regions (using higher (/physical) layer signaling). (The) PUSCH-related rate-matching (puncturing) operation may be (limitedly) applied only when SHD_PUCCH resource region indicated by SHD_RSINDI overlaps (partially) with (scheduled) PUSCH.

The SHD_RSINDI may be implemented in a user equipment (group)-specific (and/or cell-specific) indicator form or in a specific field form in a PUSCH scheduling-related UL grant.

The (specific) SHD_PUCCH resource region may be configured (/signaled) as a partial (or entire) resource region on the system band. One of the states indicated by the SHD_RSINDI (bit) may be configured (/signaled) to indicate that there is no SHD_PUCCH resource region with which the PUSCH is rate-matched (or punctured) and/or that all of the pre-configured plurality of SHD_PUCCH resource regions are used for the PUSCH transmission.

The pre-uplink control (subband) region (for example, SHD_PUCCH) may be pre-configured/signaled in a semi-static manner. When the resource region of the scheduled PUSCH and the resource region of the uplink control (subband) region overlap (partially) with each other, the user equipment may be configured to rate-match (or puncture) the PUSCH with respect to the corresponding uplink control (subband) region.

Signaling the position information of the last symbol of the scheduled PUSCH using a pre-defined indicator (for example, a specific field in the UL grant) may allow the resource regions between the scheduled PUSCH and the uplink control (subband) region not to overlap.

When the corresponding rule is applied, an independent grant (or DCI) for scheduling corresponding resource regions may be defined to prevent the remaining frequency resource regions on symbols corresponding to the uplink control (subband) region from being wasted.

In one of the combination forms of the above-illustrated rules, when the resource regions of the pre-configured (/signaled) uplink control (subband) region and the scheduled PUSCH overlap (partially), the UE may rate-match (or puncture) the PUSCH with respect to the corresponding uplink control (subband) region. Otherwise, the UE may be able to map/transmit data including up to the last symbol of the signaled PUSCH to the frequency resource allocated (using the UL grant).

[Proposed Method #8] When the resource regions of the LNG_PUCCH (and/or SHD PUCCH) and the PUSCH partially overlap and/or the LNG_PUCCH (and/or SHD PUCCH) and PUSCH are FDMed with each other, the scheduling (/signaling) may be performed by the serving base station such that (A) the PUSCH is rate-matched (or punctured) with respect to the (corresponding) LNG_PUCCH (and/or SHD PUCCH) resource region, and/or such that (B) the (corresponding) LNG_PUCCH (and/or SHD PUCCH)-related transmission information may be piggy-backed on the PUSCH.

When piggybacking/triggering a plurality of ACK/NACK information corresponding to a downlink data channel (PDSCH) reception on a specific (time) duration pre-configured (signaled) via the UL grant, the rate-matching (rather than puncturing) may be applied to the corresponding (plurality of ACK/NACK) information which in turn may be mapped onto the PUSCH as scheduled.

When the aperiodic CSI (A-CSI) (reporting) is triggered via the DL grant, and when the PUSCH transmission is scheduled at the corresponding A-CSI reporting time-point, not the rate-matching but the puncturing may be applied to the corresponding A-CSI information, which in turn may be mapped onto the PUSCH as scheduled.

Regarding the application of the rule, different schemes may be applied to the corresponding UCI mapping depending on whether the UCI triggering is performed using a DL grant (for example, puncturing scheme application) and an UL grant (for example, rate-matching scheme application) in performing the operation of piggybacking UCI onto the PUSCH.

In the operation of piggybacking UCI onto the PUSCH, the scheme applied to the corresponding UCI mapping may be differently configured according to the UCI type (/priority). For example, the UCI type (for example, ACK/NACK) of a relatively high priority (/importance) as pre-configured (/signaled) is subjected to the puncturing and thus is mapped onto the PUSCH. The UCI type (for example, PMI/CQI (/RI)) of a relatively low priority (/importance) as pre-configured (/signaled) is subjected to the rate-matching and then is mapped onto the PUSCH.

For the same UCI type (/priority) as pre-configured (/signaled), the resource position on which the corresponding UCI is piggybacked may vary based on the kind (/type) of the DCI triggering the UCI, and/or the (corresponding to UCI type/priority).

Hereinafter, for the sake of convenience in the description, a PUCCH as is transmitted while being FDMed with the PUSCH and while occupying all symbols or symbols other than few symbols in the specific position (for example, the last position) in a specific time unit (for example, a subframe or a slot) is called LONG PUCCH. Furthermore, a PUCCH as is transmitted while being TDMed with the PUSCH and while occupying few symbols in the specific position (for example, the last position) in a specific time unit (for example, a subframe or a slot) is called SHORT PUCCH.

The LONG PUCCH may be (in an extended manner) interpreted as (/(interchanged with)) LNG_PUCCH. The SHORT PUCCH may be (in an extended manner) interpreted as (/(interchanged with)) SHD_PUCCH. Following methods (/rules) or (some thereof) may be merged.

[Proposed Method #9] Whether to perform an uplink transmission operation using the UCI piggyback on the PUSCH, or using the concurrent transmission of PUCCH and PUSCH in a slot (or subframe) may be individually configured for each of the LONG PUCCH and SHORT PUCCH.

For the LONG PUCCH, when there is a PUSCH in the same slot (or subframe), the UCI piggyback scheme on the PUSCH may be used to perform the uplink transmission operation. Moreover, for SHORT PUCCH, when there is a PUSCH in the same slot (or subframe), the uplink transmission operation may be performed using the concurrent transmission (PUCCH/PUSCH) scheme of PUCCH and PUSCH.

In another opposite example, for the LONG PUCCH, when there is a PUSCH in the same slot (or subframe), the uplink transmission operation may be performed using the concurrent transmission (PUCCH/PUSCH) scheme of PUCCH and PUSCH. To the contrary, For the SHORT PUCCH, when there is a PUSCH in the same slot (or subframe), the UCI piggyback scheme on the PUSCH may be used to perform the uplink transmission operation.

[Proposed Method #10] For one of the LONG PUCCH and SHORT PUCCH, whether the UCI piggyback on the PUSCH scheme or the concurrent transmission scheme of PUCCH and PUSCH is applied to the uplink transmission operation may be configured/signaled via a higher layer signal (for example, RRC signal). For the other of the LONG PUCCH and SHORT PUCCH, whether the UCI piggyback on the PUSCH scheme or the concurrent transmission scheme of PUCCH and PUSCH is applied to the uplink transmission operation may be configured/signaled via the DCI (for example, DL/UL grant).

For the LONG PUCCH, whether the UCI piggyback on the PUSCH scheme or the concurrent transmission scheme of PUCCH and PUSCH is applied to the uplink transmission operation may be configured/signaled semi-statically via RRC. For the SHORT PUCCH, whether the UCI piggyback on the PUSCH scheme or the concurrent transmission scheme of PUCCH and PUSCH is applied to the uplink transmission operation may be configured/signaled dynamically using the DCI.

In another opposite example, for the SHORT PUCCH, whether the UCI piggyback on the PUSCH scheme or the concurrent transmission scheme of PUCCH and PUSCH is applied to the uplink transmission operation may be configured/signaled semi-statically via RRC. For the LONG PUCCH, whether the UCI piggyback on the PUSCH scheme or the concurrent transmission scheme of PUCCH and PUSCH is applied to the uplink transmission operation may be configured/signaled dynamically using the DCI.

[Proposed Method #11] In one example, whether the UCI piggyback on the PUSCH scheme or the concurrent transmission scheme of PUCCH and PUSCH is applied to the uplink transmission operation in a single slot (or subframe) may be individually configured/signaled for each of OFDM PUSCH and SC-FDM PUSCH.

For the SC-FDM PUSCH, when there is a PUCCH in the same slot (or subframe), the UCI piggyback scheme on the PUSCH may be used to perform the uplink transmission operation. Moreover, for OFDM PUSCH, when there is a PUCCH in the same slot (or subframe), the uplink transmission operation may be performed using the concurrent transmission (PUCCH/PUSCH) scheme of PUCCH and PUSCH. In the other opposite case, For the OFDM PUSCH, when there is a PUCCH in the same slot (or subframe), the UCI piggyback scheme on the PUSCH may be used to perform the uplink transmission operation. Moreover, for SC-FDM PUSCH, when there is a PUCCH in the same slot (or subframe), the uplink transmission operation may be performed using the concurrent transmission (PUCCH/PUSCH) scheme of PUCCH and PUSCH.

[Proposed Method #12] For one of the OFDM PUSCH and SC-FDM PUSCH, whether the UCI piggyback on the PUSCH scheme or the concurrent transmission scheme of PUCCH and PUSCH is applied to the uplink transmission operation may be configured/signaled via a higher layer signal (for example, RRC signal). For the other of the OFDM PUSCH and SC-FDM PUSCH, whether the UCI piggyback on the PUSCH scheme or the concurrent transmission scheme of PUCCH and PUSCH is applied to the uplink transmission operation may be configured/signaled via the DCI (for example, DL/UL grant). For the OFDM PUSCH, whether the UCI piggyback on the PUSCH scheme or the concurrent transmission scheme of PUCCH and PUSCH is applied to the uplink transmission operation may be configured/signaled semi-statically via RRC. For the SC-FDM PUSCH, whether the UCI piggyback on the PUSCH scheme or the concurrent transmission scheme of PUCCH and PUSCH is applied to the uplink transmission operation may be configured/signaled dynamically using the DCI. In another opposite example, for the SC-FDM PUSCH, whether the UCI piggyback on the PUSCH scheme or the concurrent transmission scheme of PUCCH and PUSCH is applied to the uplink transmission operation may be configured/signaled semi-statically via RRC. For the OFDM PUSCH, whether the UCI piggyback on the PUSCH scheme or the concurrent transmission scheme of PUCCH and PUSCH is applied to the uplink transmission operation may be configured/signaled dynamically using the DCI.

[Proposed Method #13] Whether the UCI piggyback on the PUSCH scheme or the concurrent transmission scheme of PUCCH and PUSCH is applied to the uplink transmission operation may be individually configured/signaled for each of combinations between the PUCCH type (i.e., SHORT or LONG) and PUSCH type (i.e., OFDM or SC-FDM). For example, four possible combinations between the PUCCH type and PUSCH type may include (SHORT, SC-FDM), (SHORT, OFDM), (LONG, SC-FDM) and (LONG, OFDM). Thus, Whether the UCI piggyback on the PUSCH scheme or the concurrent transmission scheme of PUCCH and PUSCH is applied to the uplink transmission operation may be individually configured/signaled for each of (SHORT, SC-FDM), (SHORT, OFDM), (LONG, SC-FDM) and (LONG, OFDM).

[Proposed Method #14] Depending on the waveform of the PUSCH form, the UL multiplexing rule may vary.

In one example, (A) when PUSCH is SC-FDMed or DFT-S-OFDMed, the UCI piggyback scheme onto the PUSCH for the LNG_PUCCH (or SHD_PUCCH) (being transmitted or overlapped on the same slot) (that is, in this scheme, the UCI to be scheduled to be transmitted on the PUCCH is piggybacked on the PUSCH and is transmitted together with the UL data and the PUCCH based transmission is skipped) may be considered as a default (operation) scheme.

For example, for the user equipment implementing the SC-FDM or DFT-S-OFDM-based signal transmission on the PUSCH, the UCI piggyback operation on the PUSCH may be defined as a mandatory feature to be implemented or supported by the UE. The concurrent transmission operation of PUCCH and PUSCH (i.e., simultaneously transmitting PUCCH and PUSCH within the same slot) may be defined as an optional feature that may be optional for the user equipment. Thus, the concurrent transmission operation of PUCCH and PUSCH (i.e., simultaneously transmitting PUCCH and PUSCH within the same slot) may be configured for the UE by the network depending on the user equipment capability.

(B) When the PUSCH is OFDMed, the concurrent PUCCH and PUSCH-based transmission scheme for the LNG_PUCCH (or SHD_PUCCH) (overlapped or transmitted on the same slot) may be regarded as a default (operation).

For example, for the user equipment implementing the OFDM-based signal transmission on the PUSCH, the concurrent transmission operation of the PUCCH and PUSCH may be defined as a mandatory feature to be supported/implemented by the UE. The UCI piggyback operation on the PUSCH may be defined as an optional feature to be optionally implemented or supported by the UE. Thus, the UCI piggyback operation on the PUSCH may be configured for the UE by the network depending on the user equipment capability.

In another example, for the UE to implement/support the SC-FDM or DFT-S-OFDM-based signal transmission (on the PUSCH) and/or the UE to implement/support the UCI piggyback operation and the concurrent transmission operation of PUCCH and PUSCH as the mandatory features, there is no configuration (/signaling) from the base station to the UE to indicate which operation among the above operations should be applied or such configuration (/signaling) is not yet received. In this case, the UCI piggyback operation on the PUSCH may be configured, for the corresponding user equipment, as the default (operation) to be applied.

In another example, for the UE to implement/support the OFDM-based signal transmission (on the PUSCH) and/or the UE to implement/support the piggyback operation and the concurrent transmission operation of PUCCH and PUSCH as the mandatory features, there is no configuration (/signaling) from the base station to the UE to indicate which operation among the above operations should be applied or such configuration (/signaling) is not yet received. In this case, the concurrent transmission operation of PUCCH and PUSCH may be configured, for the corresponding user equipment, as the default (operation) to be applied.

Alternatively, for the UE to implement/support the SC-FDM or DFT-S-OFDM-based signal transmission (on the PUSCH) and the OFDM-based signal transmission (on the PUSCH) as the mandatory features (that is, for the UE to implement/support both of the SC-FDM or DFT-S-OFDM-based signal transmission (on the PUSCH) and of the OFDM-based signal transmission (on the PUSCH)), there is no configuration (/signaling) from the base station to the UE to indicate which operation among the above operations should be applied or such configuration (/signaling) is not yet received. In this case, the SC-FDM or DFT-S-OFDM-based signal transmission (on the PUSCH) (or the OFDM-based signal transmission (on the PUSCH)) may be configured, for the corresponding user equipment, as the default (operation) to be applied.

A method for obtaining antenna (/port) diversity when performing multiple symbols SHD_PUCCH (or LNG_PUCCH)-based transmission may be as follows. The following rules (or some thereof) may be limitedly applied only when the reference signal (RS) and the UCI are configured (defined) to be FDMed (on the symbol) (and/or to be subjected to FDM RS/UCI iteration).

[Proposed Method #15] when performing multiple symbols SHD_PUCCH (or LNG_PUCCH)-based transmission, the method may perform or apply antenna port switching on a pre-configured/signaled symbol (set) basis.

Figure 29:
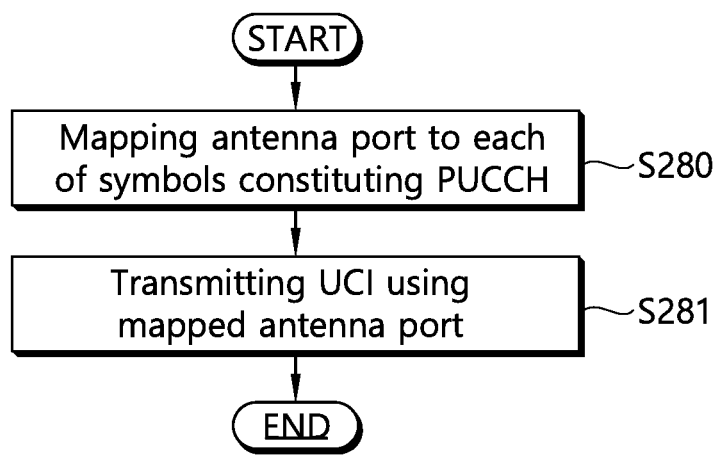
FIG. 29 illustrates the PUCCH transmission method according to the present disclosure.

FIG. 29 illustrates the PUCCH transmission method according to the present disclosure.

Referring to FIG. 29, the user equipment maps an antenna port to each of a plurality of symbols constituting the PUCCH (S280). The UE transmits the UCI using the mapped antenna port (S281).

Each of the symbols that constitute the PUCCH may be mapped to an antenna port via one of the schemes shown in FIG. 30 to FIG. 37 below. That is, in FIG. 30 to FIG. 37, when the number of multiple symbols, that is, SHD_PUCCH (or LNG_PUCCH)-related symbols and the reference signal (RS) and UCI merging/multiplexing form varies, the antenna port mapping/switching on a symbol (set) basis will be described. However, the proposed scheme of the present disclosure may be extended and applied to various other cases than the cases as described in FIG. 30 to FIG. 37.

Figure 30:
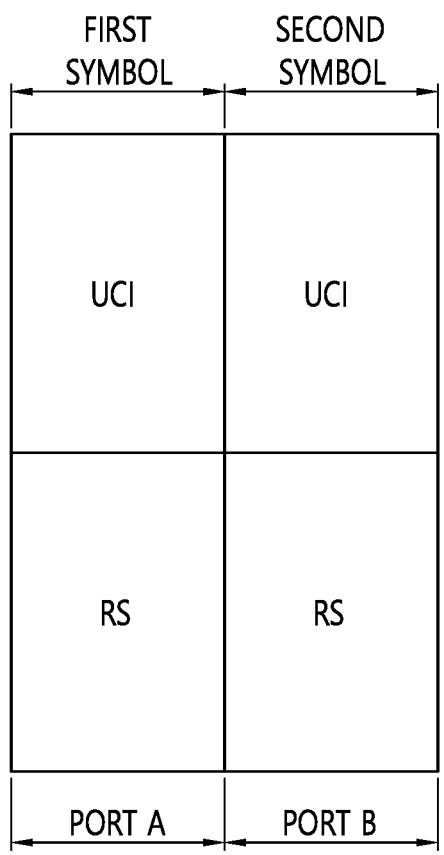
FIG. 30 illustrates antenna port mapping/switching per symbol (set of symbols) when performing two antenna ports-based 2-symbols SHD_PUCCH (or LNG_PUCCH) transmission.

FIG. 30 illustrates antenna port mapping/switching per symbol (set of symbols) when performing two antenna ports-based 2-symbols SHD_PUCCH (or LNG_PUCCH) transmission. In each symbol, UCI and the reference signal are FDMed. The first symbol maps the antenna port A. An antenna port B is mapped to the second symbol.

Figure 31:
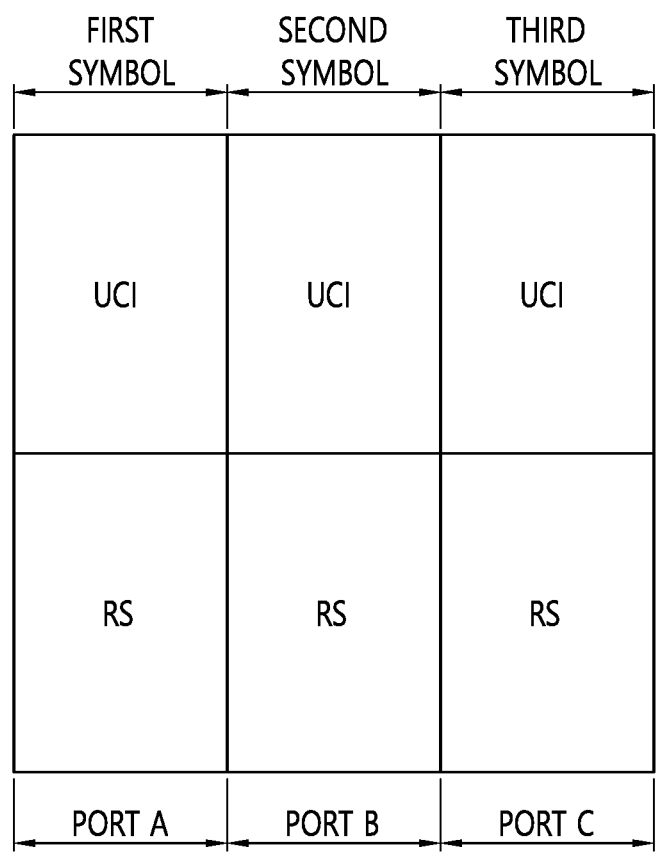
FIG. 31 illustrates antenna port mapping/switching per symbol (set of symbols) when performing three antenna ports-based 3-symbols SHD_PUCCH (or LNG_PUCCH) transmission.

FIG. 31 illustrates antenna port mapping/switching per symbol (set of symbols) when performing three antenna ports-based 3-symbols SHD_PUCCH (or LNG_PUCCH) transmission. In each symbol, UCI and the reference signal are FDMed. The first symbol maps the antenna port A. An antenna port B is mapped to the second symbol, and an antenna port C is mapped to the third symbol.

Figure 32:
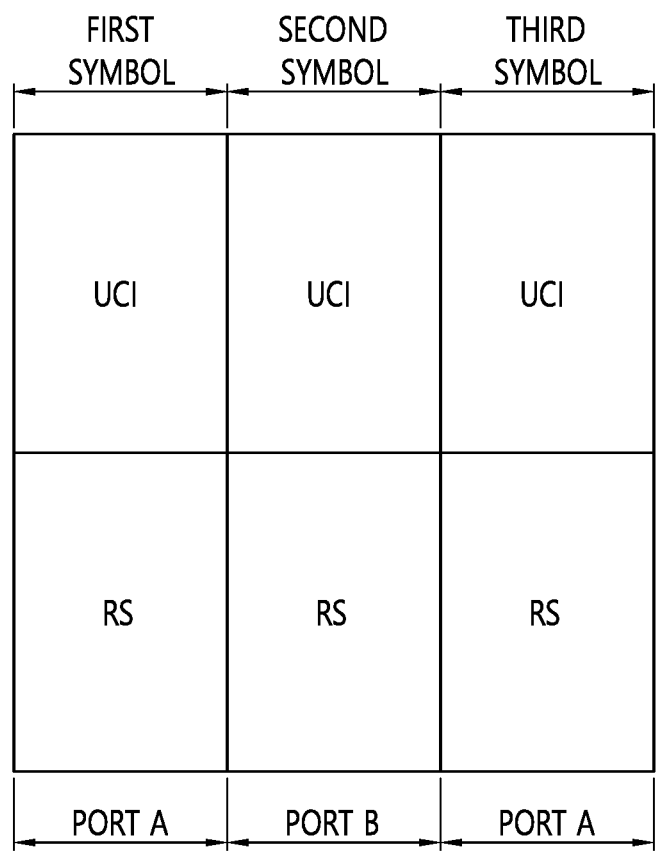
FIG. 32 illustrates antenna port mapping/switching per symbol (set of symbols) when performing two antenna ports-based 3-symbols SHD_PUCCH (or LNG_PUCCH) transmission.

FIG. 32 illustrates antenna port mapping/switching per symbol (set of symbols) when performing two antenna ports-based 3-symbols SHD_PUCCH (or LNG_PUCCH) transmission. In each symbol, UCI and reference signal are FDMed. The first symbol maps the antenna port A. The second symbol maps to the antenna port B, and the third symbol maps to the antenna port A.

Figure 33:
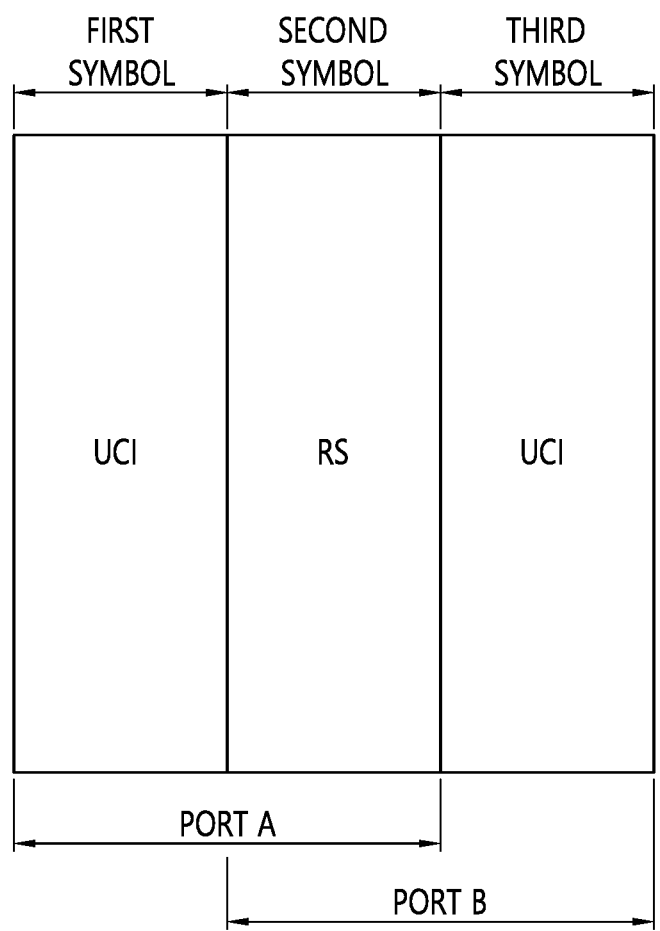
FIG. 33 illustrates antenna port mapping/switching per symbol (set of symbols) when performing two antenna ports-based 3-symbols SHD_PUCCH (or LNG_PUCCH) transmission.

FIG. 33 illustrates antenna port mapping/switching per symbol (set of symbols) when performing two antenna ports-based 3-symbols SHD_PUCCH (or LNG_PUCCH) transmission. The UCI and reference signal are TDMed. That is, the symbols (first and third symbols) in which the UCI is transmitted and the symbol (second symbol) in which the reference signal is transmitted are separated from each other in the time region. The antenna port A is mapped to the first symbol and second symbol. The second symbol and the third symbol are mapped to the antenna port B. As shown in FIG. 33, when the reference signal on the same symbol is mapped to a plurality of antenna ports, the reference signal resources mapped to different antenna ports are divided into (A) transmission combs in different frequency resource regions; (B) are distinguished based on a root index and/or a circular shift (for ZADOFF-CHU sequence); (C) are distinguished based on a scrambling seed and/or a orthogonal cover code (OCC) (for the pseudo-random sequence). Alternatively, when the same transmission diversity scheme may be configured or applied between the multiple symbols SHD_PUCCH (or LNG_PUCCH) and the single symbol SHD_PUCCH, (efficient) multiplexing therebetween may be secured.

Figure 34:
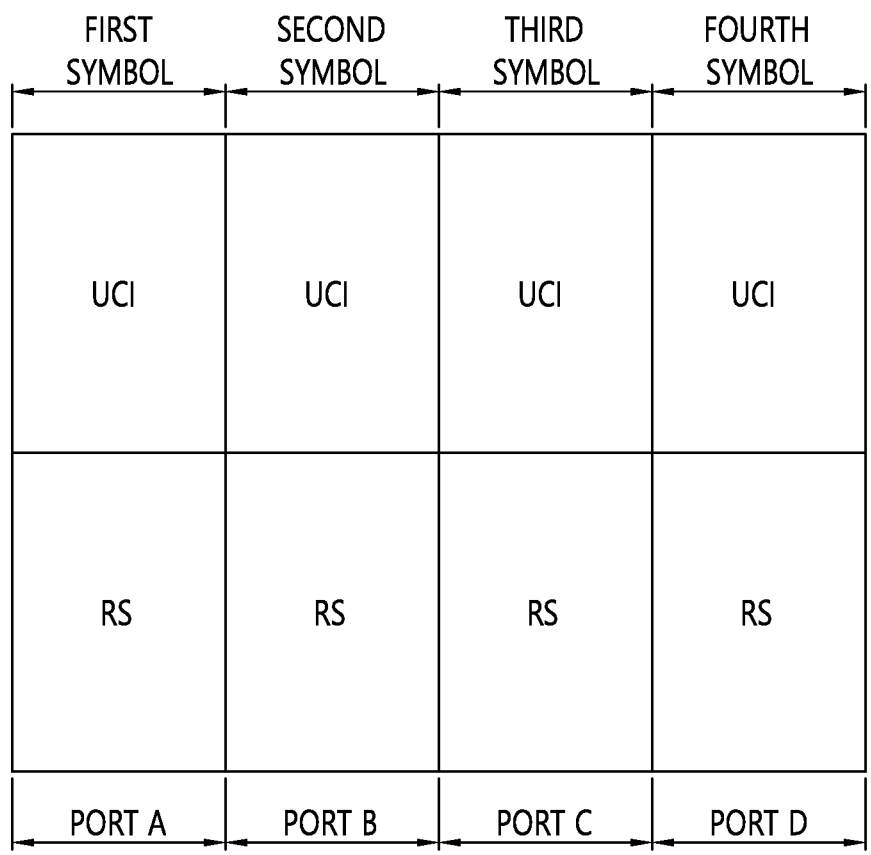
FIG. 34 illustrates antenna port mapping/switching per symbol when performing four antenna ports-based 4-symbols SHD_PUCCH (or LNG_PUCCH) transmission.

FIG. 34 illustrates antenna port mapping/switching per symbol when performing four antenna ports-based 4-symbols SHD_PUCCH (or LNG_PUCCH) transmission. In each symbol, UCI and reference signal are FDMed with each other. The first symbol maps the antenna port A. An antenna port B is mapped to the second symbol, an antenna port C is assigned to the third symbol, and an antenna port D is mapped to the fourth symbol.

Figure 35:
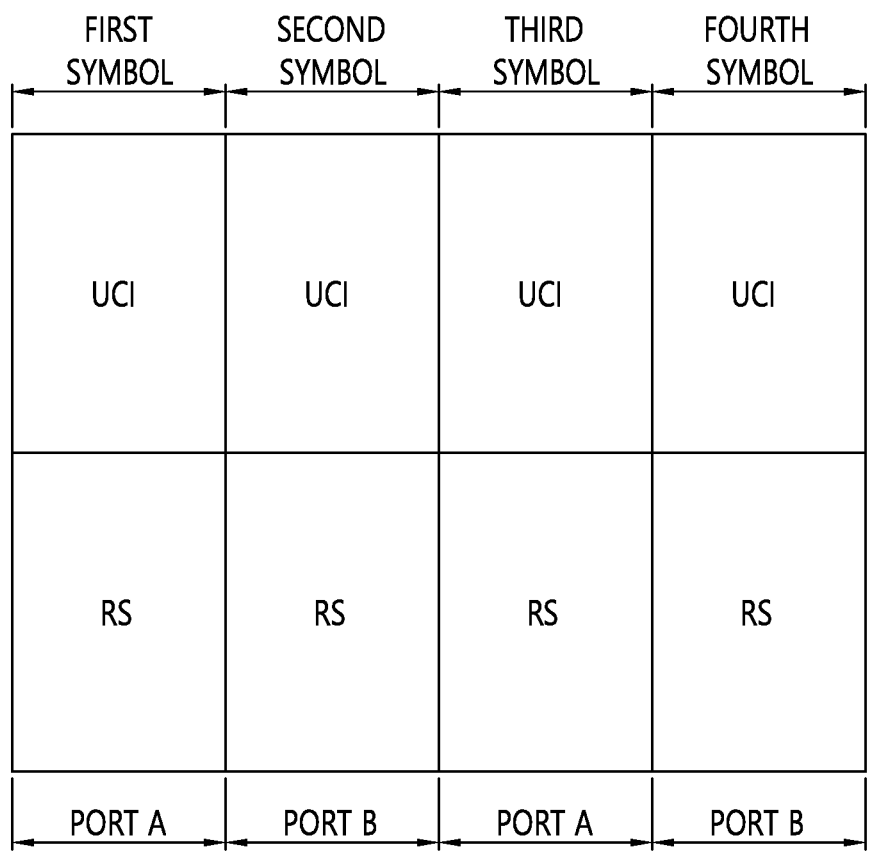
FIG. 35 illustrates antenna port mapping/switching per symbol (set of symbols) when performing two antenna ports-based 4-symbols SHD_PUCCH (or LNG_PUCCH) transmission.

FIG. 35 illustrates antenna port mapping/switching per symbol (set of symbols) when performing two antenna ports-based 4-symbols SHD_PUCCH (or LNG_PUCCH) transmission. In each symbol, UCI and reference signal are FDMed. The first symbol and the third symbol are mapped to the antenna port A. The second symbol and the fourth symbol are mapped to the antenna port B.

Figure 36:
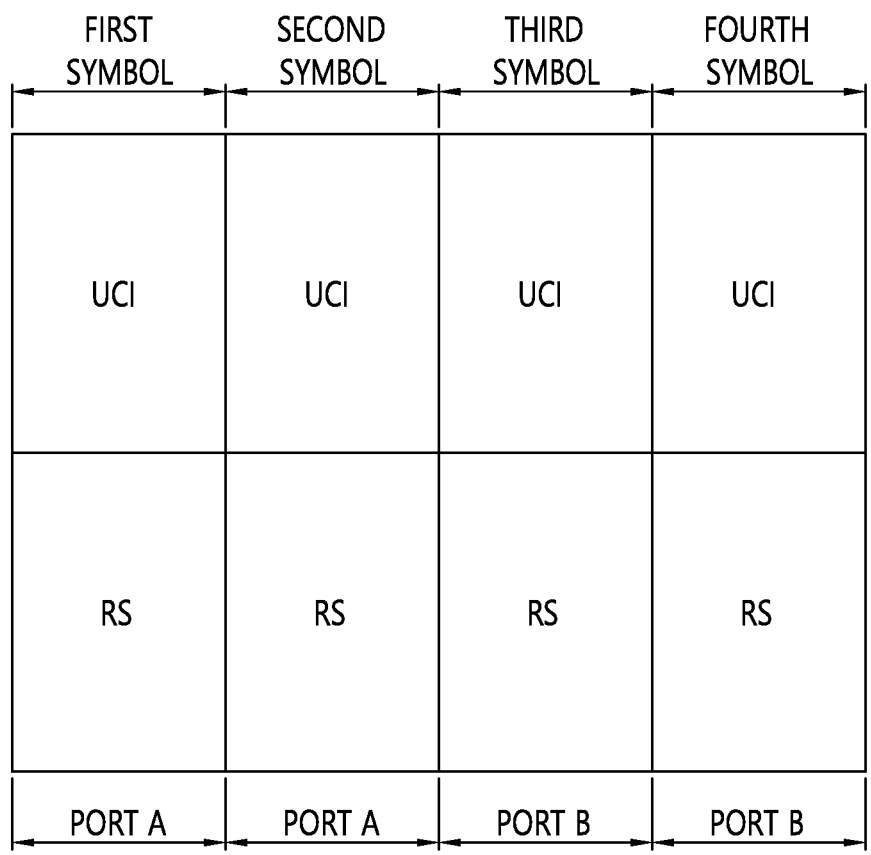
FIG. 36 illustrates antenna port mapping/switching per symbol (set of symbols) when performing two antenna ports-based 4-symbols SHD_PUCCH (or LNG_PUCCH) transmission.

FIG. 36 illustrates antenna port mapping/switching per symbol (set of symbols) when performing two antenna ports-based 4-symbols SHD_PUCCH (or LNG_PUCCH) transmission. In each symbol, UCI and reference signal are FDMed. Antenna port A is mapped to first symbol and second symbol. The third symbol and the fourth symbol are mapped to the antenna port B.

Figure 37:
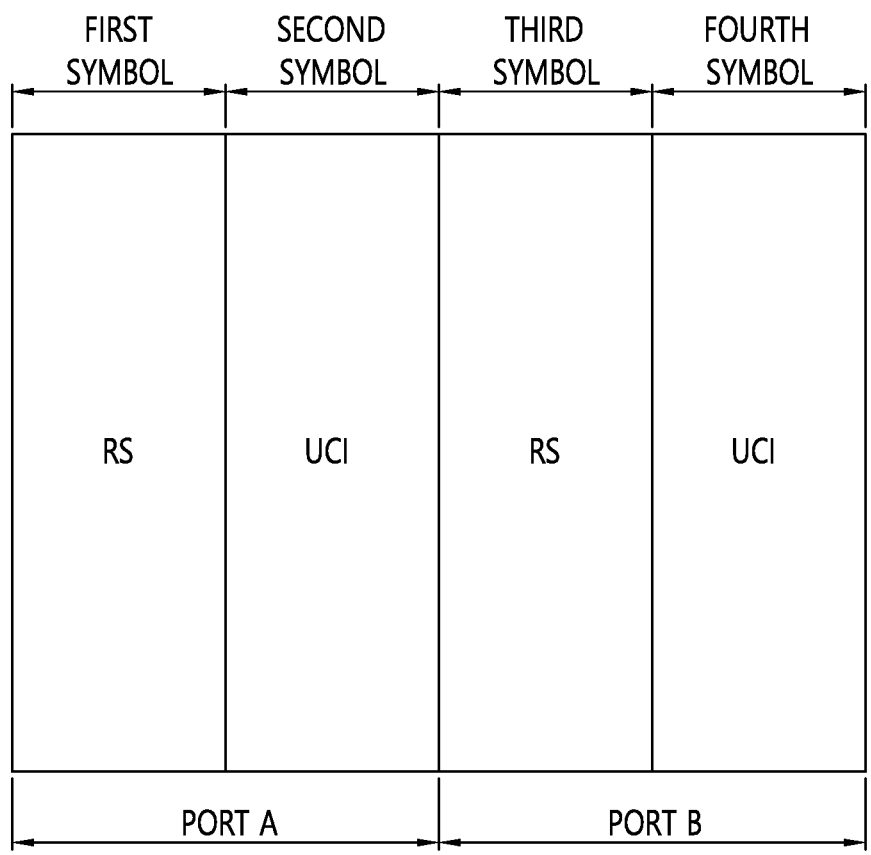
FIG. 37 illustrates antenna port mapping/switching per symbol (set of symbols) when performing two antenna ports-based 4-symbols SHD_PUCCH (or LNG_PUCCH) transmission.

FIG. 37 illustrates antenna port mapping/switching per symbol (set of symbols) when performing two antenna ports-based 4-symbols SHD_PUCCH (or LNG_PUCCH) transmission. UCI and reference signal are TDMed. That is, the symbol in which the reference signal is transmitted and the symbol in which the UCI is transmitted are distinguished in the time region. For example, the reference signal is transmitted using the first and third symbols. The UCI is transmitted using the second symbol and the fourth symbol. The antenna port A is mapped to first symbol and second symbol. The third symbol and the fourth symbol are mapped to the antenna port B.

[Proposed Method #16] When the [Proposed Method #15] described above is applied, (A) a corresponding redundancy version of UCI (redundancy version: RV) may be mapped to each of the symbols (sets) in which the antenna port switching is performed or applied or to each of the symbols (sets) to which different antenna ports are mapped. Additionally or alternatively, (B) the same UCI (or associated redundancy version: RV) may be repeatedly mapped to the symbols (sets) in which the antenna port switching is performed or applied or to the symbols (sets) to which different antenna ports are mapped.

Additionally or alternatively, (C) each of (pre-divided) different portions (or sets thereof) of the entire UCI may be mapped to each of the symbols (sets) in which the antenna port switching is performed or applied or to each of the symbols (sets) to which different antenna ports are mapped.

The examples of the above-described proposed scheme may be included as implementation of the present disclosure and thus may be considered as kinds of a proposed scheme. In addition, the above-described proposed schemes may be implemented independently or in combination with some proposed schemes.

The scope of the system in which the proposed scheme of the present disclosure is applied may be extended to other systems in addition to the 3GPP LTE/LTE-A system. In one example, the proposed schemes of the present disclosure may be limitedly applied only to OFDMA (and/or SC-FDMA)-based uplink channel/signal transmission.

In the present disclosure, the term "overlap" may be interpreted to include the case where (A) the frequency resource entirely or partially overlaps (between SHD_PUCCH and LNG_PUCCH) and/or where (B) the frequency resources do not overlap (between SHD_PUCCH and LNG_PUCCH), but the SHD_PUCCH and LNG_PUCCH-based transmissions are configured on the same symbol.

In the present disclosure, the SHD_PUCCH may be extended to (/interchanged or replaced with) SRS (or PUSCH). the LNG_PUCCH may be extended to (/interchanged with or mutually replaced with) PUSCH (or SRS). In such a case, the proposed scheme described in the present disclosure may be applied to each of the four combinations (for example, "SHD_PUCCH and LNG_PUCCH", "SHD_PUCCH and PUSCH (or SRS)", "LNG_PUCCH and SRS (or PUSCH)", "PUSCH and SRS").

As used herein, the puncturing (PNG) (or rate-matching (RM)) in the present disclosure may be replaced with the rate-matching (or the puncturing) respectively. In the present disclosure, a slot (or subframe) may be interchanged with a subframe (or slot) respectively.

The "(transmission) interruption" (or "transmission drop") in the present disclosure may be interpreted as at least one of interrupting or skipping transmission on the overlapping region, and interrupting or skipping all of transmissions at and after the overlapping region.

The proposed schemes of the present disclosure are limitedly applied only when LNG_PUCCH (or PUSCH (or SRS)) and SHD_PUCCH (or SRS (or PUSCH)) are transmitted (in an overlapping manner) on the same slot.

The proposed schemes of the present disclosure may be limitedly applied only to localized SHD_PUCCH (and/or distributed SHD_PUCCH).

The proposed schemes of the present disclosure may be limitedly applied only to handling of overlapping between LNG_PUCCH (or PUSCH (or SRS)) and SHD_PUCCH (or SRS (or PUSCH)) of a single user equipment UE (and/or different UEs).

The proposed schemes of the present disclosure may only be limitedly applied to SHD_PUCCH (and/or LNG_PUCCH) and/or PUSCH (and/or SRS) transmission based on SC-FDM (or DFT-S-OFDM) (or OFDM).

Figure 38:
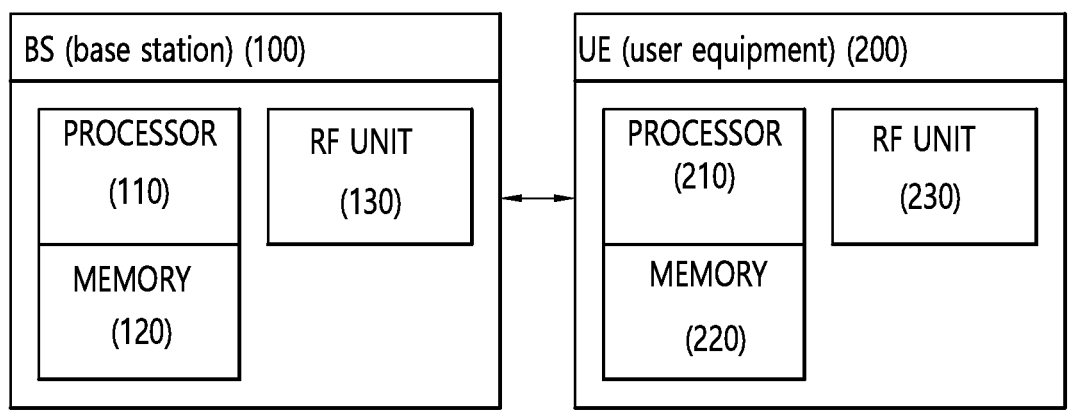
FIG. 38 is a block diagram illustrating a BS and a UE which embodiments of the present invention are implemented.

FIG. 38 is a block diagram illustrating a BS and a UE which embodiments of the present invention are implemented.

Referring to FIG. 38, the BS 100 includes a processor 110, a memory 120, and a radio frequency (RF) unit 130. The processor 110 implements proposed functions, processes, and/or methods. The memory 120 is connected to the processor 110 and stores various pieces of information for driving the processor 110. The RF unit 130 is connected to the processor 110 and transmits and/or receives radio signals.

The UE 200 includes a processor 210, a memory 220, and a RF unit 230. The processor 210 implements proposed functions, processes, and/or methods. For example, the processor 210 may generate modulation symbols of UCI, map the modulation symbols to physical uplink shared channel (PUSCH) region, and transmit the modulation symbols mapped to the PUSCH region. Herein, the modulation symbols may be mapped to be symmetric in a frequency domain based on a specific frequency in the PUSCH region. The memory 220 is connected to the processor 210 and stores various pieces of information for driving the processor 210. The RF unit 230 is connected to the processor 210 and transmits and/or receives radio signals.

The processors 110 and 210 may include an application-specific integrated circuit (ASIC), a separate chipset, a logic circuit, a data processing device, and/or a converter to convert a baseband signal and a radio signal to and from one another. The memories 120 and 220 may include a read-only memory (ROM), a random access memory (RAM), a flash memory, a memory card, a storage medium, and/or other storage devices. The RF unit 130 and 230 may include one or more antennas to transmit and/or receive radio signals. When an embodiment is implemented in software, the aforementioned methods may be implemented with a module (process, function, or the like) to perform the aforementioned functions. The module may be stored in the memories 120 and 220 and may be performed by the processors 110 and 210. The memories 120 and 220 may be disposed inside or outside the processors 110 and 210 and may be connected to the processors 110 and 210 via various well-known means.

What is claimed is:

1. A method for transmitting, by a user equipment (UE), uplink control information (UCI) in a wireless communication system, the method comprising:
   generating modulation symbols of the UCI;
   mapping the modulation symbols to a physical uplink shared channel (PUSCH) region; and
   transmitting the modulation symbols mapped to the PUSCH region,
   wherein the modulation symbols are mapped to the PUSCH region in a symmetric manner based on a specific frequency in a frequency region,
   wherein a phase interference compensation reference signal (PCRS) is mapped to the specific frequency in successive time durations constituting the PUSCH region, and
   wherein a first symbol of a subframe including the PUSCH region is mapped to a demodulation reference signal (DM RS), and the UCI maps to a second symbol neighboring to the first symbol corresponding to a location of the DM RS in the time region.

2. The method of claim 1, wherein the UCI is preferentially mapped to a resource element (RE) neighboring to the PCRS.

3. The method of claim 2, wherein the UCI includes an ACK/NACK (acknowledgment/negative-acknowledgment).

4. The method of claim 1, wherein the UCI includes at least one of ACK/NACK (acknowledgment/negative-acknowledgment), rank indication (RI), precoding matrix indicator (PMI) and channel quality indicator (CQI).

5. The method of claim 4, wherein after data mapping to the PUSCH region is punctured, the ACK/NACK is mapped to the PUSCH region.

6. A user equipment (UE) comprising:
   a radio frequency (RF) unit for transmitting and receiving a radio signal; and
   a processor operating in conjunction with the RF unit, wherein the processor is configured for:
   generating modulation symbols of the UCI;
   mapping the modulation symbols to a physical uplink shared channel (PUSCH) region; and
   transmitting the modulation symbols mapped to the PUSCH region,
   wherein the modulation symbols are mapped to the PUSCH region in a symmetric manner based on a specific frequency in a frequency region,
   wherein a phase interference compensation reference signal (PCRS) is mapped to the specific frequency in successive time durations constituting the PUSCH region, and
   wherein a first symbol of a subframe including the PUSCH region is mapped to a demodulation reference signal (DM RS), and the UCI maps to a second symbol neighboring to the first symbol corresponding to a location of the DM RS in the time region.

* * * * *